(12) United States Patent
Hansen

(10) Patent No.: US 10,206,340 B2
(45) Date of Patent: *Feb. 19, 2019

(54) PIVOT IRRIGATION SYSTEM AND COMPONENTS

(71) Applicant: 7A9, LLC, Lewiston, UT (US)

(72) Inventor: Brian G. Hansen, Malta, ID (US)

(73) Assignee: 7A9, LLC, Lewiston, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,270

(22) Filed: Jun. 16, 2017

(65) Prior Publication Data
US 2017/0280640 A1    Oct. 5, 2017

Related U.S. Application Data

(63) Continuation-in-part of application No. 14/532,555, filed on Nov. 4, 2014, now Pat. No. 9,706,721.
(Continued)

(51) Int. Cl.
*B05B 3/00* (2006.01)
*A01G 25/09* (2006.01)
(Continued)

(52) U.S. Cl.
CPC .......... *A01G 25/092* (2013.01); *B60K 7/0007* (2013.01); *B62D 55/10* (2013.01);
(Continued)

(58) Field of Classification Search
CPC .... A01G 25/092; A01G 25/097; B62D 55/10; B62D 55/24; B62D 55/244; B62D 55/20
(Continued)

(56) References Cited

U.S. PATENT DOCUMENTS

| | | | |
|---|---|---|---|
| 1,966,783 | A | 3/1932 | Balaam |
| 3,738,714 | A | 6/1973 | Ness |

(Continued)

FOREIGN PATENT DOCUMENTS

| | | |
|---|---|---|
| CN | 103693121 A | 4/2014 |
| FR | 2893585 A1 | 5/2007 |

(Continued)

OTHER PUBLICATIONS

U.S. Appl. No. 14/532,555, filed Nov. 4, 2014, Brian G. Hansen.
(Continued)

*Primary Examiner* — Steven J Ganey
(74) *Attorney, Agent, or Firm* — Workman Nydegger

(57) ABSTRACT

In one example, a continuous track transport system for an irrigation system is provided that includes a continuous track with multiple track plates arranged so that adjacent plates are directly connected to each other, and also includes a gear train connected with the continuous track and operable to transmit an input torque to the continuous track to effect movement of the continuous track. The gear train includes a drive gear having an interface that is connectible to a gearbox of an irrigation system chassis, first and second driven sprocket-gears engaged with the continuous track, each of first and second driven sprocket-gears including a respective driven gear engaged with the drive gear, and a frame to which one or more gears of the gear train are rotatably mounted. Any one or more of the drive gear, sprocket-gear, and frame may comprise, or consist of, molded, glass-filled nylon.

22 Claims, 48 Drawing Sheets

Related U.S. Application Data

(60) Provisional application No. 62/393,800, filed on Sep. 13, 2016.

(51) Int. Cl.
| | |
|---|---|
| *B62D 55/24* | (2006.01) |
| *B62D 55/10* | (2006.01) |
| *B62D 55/12* | (2006.01) |
| *F16H 55/06* | (2006.01) |
| *B60K 7/00* | (2006.01) |
| *B05B 1/20* | (2006.01) |

(52) U.S. Cl.
CPC ............ *B62D 55/12* (2013.01); *B62D 55/24* (2013.01); *F16H 55/06* (2013.01); *B05B 1/20* (2013.01); *B60Y 2200/224* (2013.01)

(58) Field of Classification Search
USPC ........ 239/728, 735, 741, 750; 305/128, 168, 305/178, 195
See application file for complete search history.

(56) References Cited

U.S. PATENT DOCUMENTS

| | | | |
|---|---|---|---|
| 4,365,748 | A | 12/1982 | Emrich |
| 5,078,326 | A | 1/1992 | Wright |
| 5,290,201 | A | 3/1994 | Tesker |
| 2,714,826 | A | 8/1995 | Jasper |
| 6,131,833 | A | 10/2000 | Chapman |
| 6,616,374 | B2 | 9/2003 | Starr |
| 7,814,809 | B2 | 10/2010 | Shinohara |
| 8,490,899 | B2 | 7/2013 | Korus |
| 9,706,721 | B1 | 7/2017 | Hansen |
| 2011/0148187 | A1 | 6/2011 | Lyons |
| 2013/0043332 | A1 | 2/2013 | Korus |

FOREIGN PATENT DOCUMENTS

| | | |
|---|---|---|
| RU | 2423737 C1 | 11/2011 |
| WO | WO 2009/033052 | 3/2009 |
| WO | PCT/US2015/058811 | 11/2015 |

OTHER PUBLICATIONS

U.S. Appl. No. 62/393,800, filed Sep. 13, 2016, Brian G. Hansen.
Valley, Valley Product Catalog, 2009, 32 pages, AD10098 CP/BS 1/09, Valmont Industries, Inc., Valley, NE USA.
Valley, Valley Drive Train, 2014, 12 pages, AD10695 C 04/14, Valmont Industries, Inc., Valley, NE USA.
Zimmatic by Lindsay, Irrigation Systems Product Guide, 2011, 44 pages, Zimmprodguide-Eng 1000 0811, Lindsay, Omaha, NE USA.
http://www.zimmatic.com/tracking-solutions---featuring-nftrax; description of NFTrax, accessed on Nov. 2014.
http://www.zimmatic.com/tracking -solutions---featuring-nftrax; description of Trax, accessed on Nov. 2014.
U.S. Appl. No. 14/532,555, dated Nov. 18, 2016, Office Action.
U.S. Appl. No. 14/532,555, dated Mar. 9, 2017, Notice of Allowance.
PCT/US2015/058811, dated Feb. 2, 2016, Search Report and Written Opinion.
PCT/US2015/058811, dated May 18, 2017, IPRP.
European Application No. 15856226.4 (EP3215275) European Search Report dated Feb. 27, 2018.
Australian Application No. 2015343249 Examination Report dated Aug. 24, 2017.
New Zealand Application No. 732462 Examination Report dated Sep. 27, 2017.
Russian Application No. 2017119405 Decision of Grant dated Sep. 21, 2017.
China Application No. 201580072354.X Office Action dated Nov. 26, 2018.

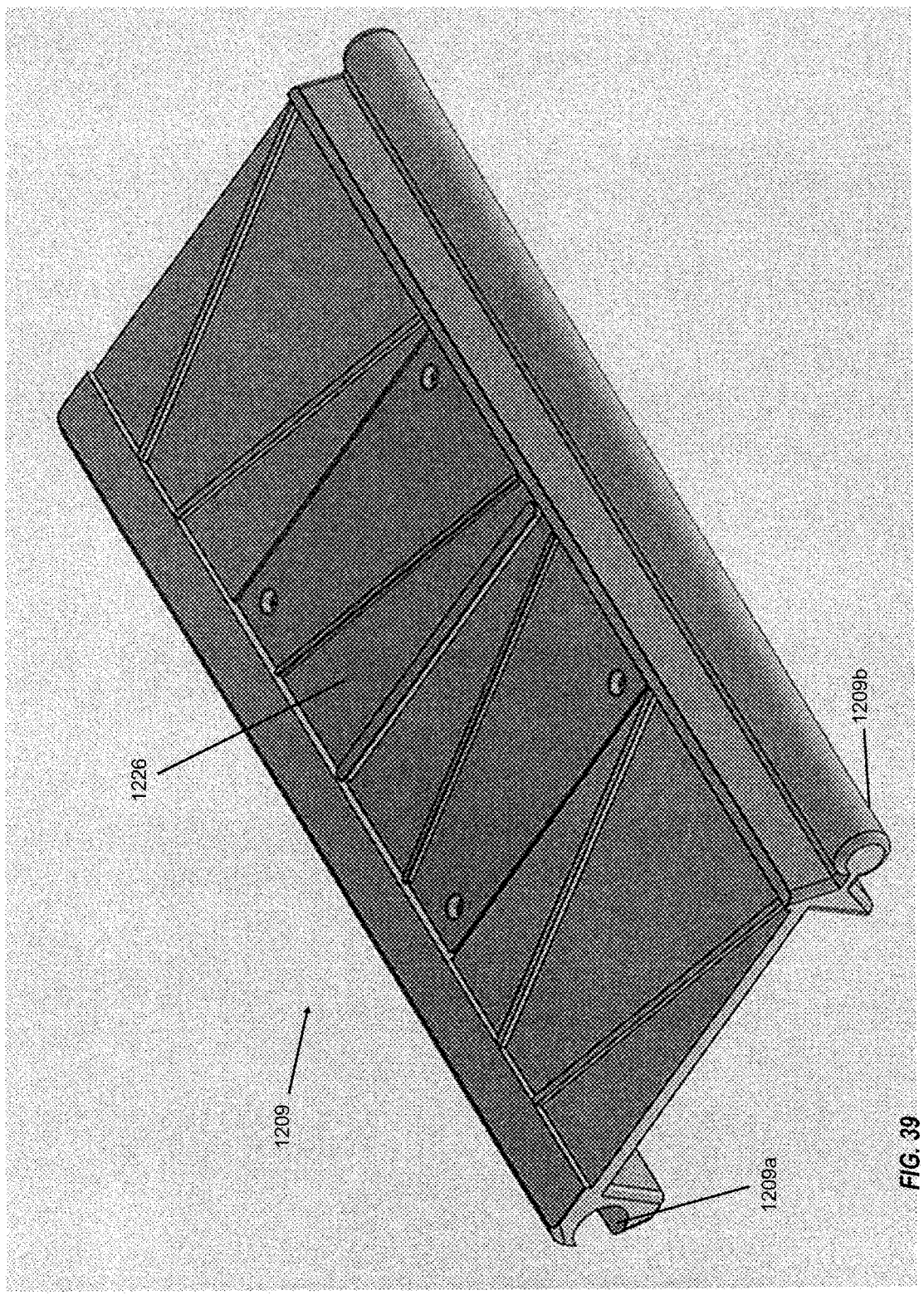

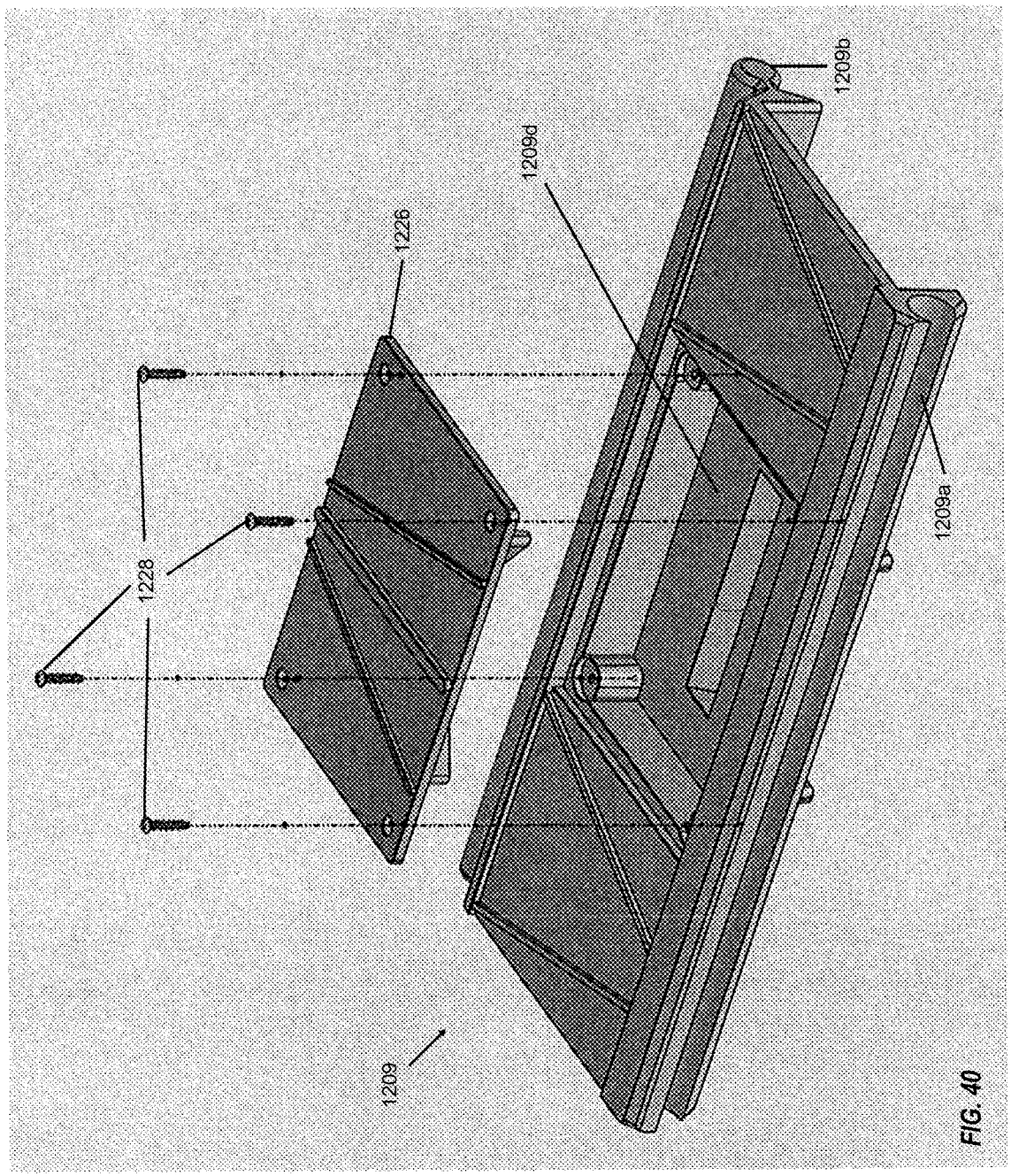

PIVOT IRRIGATION SYSTEM AND COMPONENTS

RELATED APPLICATION

This application is a continuation-in-part (CIP) of, and hereby claims priority to, U.S. patent application Ser. No. 14/532,555, entitled PIVOT IRRIGATION SYSTEM AND COMPONENTS, and filed on Nov. 4, 2014. This application also hereby claims priority to U.S. Provisional Patent Application, Ser. 62/393,800, entitled TRACK FOR IRRIGATION SYSTEM, and filed Sep. 13, 2016. All of the aforementioned applications are incorporated herein in their respective entireties by this reference.

FIELD OF THE INVENTION

The present disclosure is generally concerned with irrigation systems and related components. At least some example embodiments are concerned with pivot irrigation systems that include a continuous track transport system.

BACKGROUND

Irrigation systems are sometimes automated so that they can irrigate large fields, or portions of fields, largely without human action or intervention. To this end, such irrigation systems may include one or more sets of tires that enable the irrigation system to be moved to different locations in the field that is being irrigated. Movement of the irrigation system may be performed by way of a drive system coupled to the tires.

While the one or more sets of tires enable the repositioning of the irrigation system, the use of tires can present a variety of problems. One such problem is that, due to the weight of an irrigation system, particularly when filled with water, as well as to the relatively large size of the tires, the tires often make tracks in the soil of the irrigated field that are quite deep and/or wide. These tracks, which are sometimes referred to as pivot tracks, can make it quite difficult for other equipment, such as harvesters, trucks and tractors for example, to travel through the field.

As well, when one or more irrigation systems are moved, such tracks can make it difficult, or impossible, for the wheels of other irrigation systems to travel through the field. Moreover, these irrigation systems can experience significant wear and tear as they attempt to navigate through and over the tracks left by another irrigation system.

Another example of problems presented by the use of tires in an irrigation system concerns the field itself. In particular, the tracks created by such tires can cause soil erosion in the field. The erosion can be aggravated further if the tire tracks become filled with water and muddy, as commonly occurs.

A related problem is that the relatively wide configuration of the tires results in a corresponding reduction in the amount of field space that is available for growing. Depending upon the size of the irrigation system, and number and size of associated tires, this reduction can be quite significant in some cases.

In addition to the problems noted above, the tires themselves are inherently prone to various problems. For example, the tires typically employed in irrigation systems are pneumatic. Thus, the rubber tire material is prone to deterioration due to long exposure to the sun, and pneumatic tires may go flat as a result of valve failure or contact with a sharp object. Regardless of the failure mechanism, the tire then has to be repaired or replaced, which may be time-consuming and expensive. For example, the repair or replacement of one or more tires introduces undesirable down time for the irrigation system. This down time can be particularly problematic, for example, in hot weather conditions where an adequate flow of water is critical to the survival of the crop.

Moreover, if a tire goes flat, a farmer may not become immediately aware of the problem and, as a result, the irrigation system may continue to operate with the flat tire, or flat tires. This can put undue wear and tear on the irrigation system, including components of the drive system such as linkages and bearings, as the irrigation system moves through the field.

Moreover, even if a tire does not go flat, problems can still occur. For example, if adequate pressure is not maintained in the tire, the performance of the tire will suffer and it may be relatively more difficult for the tire to move through the field than would be the case if the tire were at the correct pressure. This problem can be aggravated further by the condition of the field where the irrigation system is employed.

As well, it should be apparent that when the foregoing problems occur in large growing operations that include numerous irrigation systems and associated tires, these problems present a significant cumulative impact on time, productivity, and finances.

Some efforts to resolve problems such as those noted above involve the use of a track that rotates around two pneumatic tires. Although such an arrangement may result in a somewhat less problematic track shape, these arrangements introduce their own set of problems. For example, the use of pneumatic tires is problematic for the reasons already stated.

As well, because these track and tire arrangements may rely on a high level of track tension for useful operation, the use of equipment such as tensioners is required. These tensioners however can impose tremendous stress on components such as shafts, bearings and gearboxes, thus reducing the useful life of those components. As well, the tensioners may be vulnerable to changes in tire pressure, such that the tension can vary with the tire pressure. Moreover, tire pressure can change dramatically throughout the course of the day and performance of the track and tire arrangement will vary accordingly. A related problem is that there is no easy way for a farmer or other user to monitor, and effect changes in tire pressure should there be a need to do so.

Finally, track and tire configurations that employ rubber tracks present still further problems. For example, rubber tracks can degrade after prolonged exposure to sun and heat. Replacement of these rubber tracks introduces further expense in the form of parts, labor, and irrigation system down time. Other problems with rubber tracks include high track tension, which can cause bearing problems, and expense.

In light of problems such as these, it would be useful to have an irrigation system, such as a pivot irrigation system, for example, that was configured in such a way that at least some of the problems associated with the use of tires may be avoided.

BRIEF SUMMARY OF SOME ASPECTS OF THE DISCLOSURE

It should be noted that the embodiments disclosed herein do not constitute an exhaustive summary of all possible embodiments, nor does this brief summary constitute an exhaustive list of all aspects of any particular embodiment (s). Rather, this brief summary simply presents selected aspects of some example embodiments. It should be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure.

As well, none of the embodiments embraced within the scope of this disclosure should be construed as resolving, or being limited to the resolution of, any particular problem(s). Nor should such embodiments be construed to implement, or be limited to implementation of, any particular technical effect(s) or solution(s).

The present disclosure is generally concerned with irrigation systems, such as pivot irrigation systems, for example, that include a continuous track transport system. In some embodiments, the continuous track transport system is configured to be backfit into already deployed irrigation systems that include tires, such as pneumatic tires. In other embodiments, the continuous track system can be included as part of the initial assembly of an irrigation system. In either case, the continuous track system can be substantially the same, that is, at least some embodiments of the continuous track system are equally well-suited to be installed at the time of initial construction or to be employed as a backfit installation. The continuous track system is particularly well-suited for use in pivot irrigation systems, but the scope of the invention is not limited to such irrigation systems, and the continuous track system can be used in any other irrigation system, or applications other than irrigation, where it may prove useful.

With continuing reference now to further example embodiments, it should be understood that embodiments within the scope of this disclosure may include any one or more of the following elements, and features of elements, in any combination: a continuous track transport system; an irrigation system that includes a continuous track transport system; a wheel-less or tire-less irrigation system; a continuous track transport system in the form of an after-market system that can be installed on an existing irrigation system that includes a wheel or tire transport system; a pivot irrigation system that includes a continuous track transport system; a continuous track transport system that does not employ tires or wheels; a continuous track transport system powered by an electric motor, or any other type of prime mover; a continuous track transport system that includes a power transmission gear train connected to a continuous track with one or more drive wheels that are operable to cause movement of the track, and the power transmission gear train is connectible to a prime mover; a prime mover for a continuous track transport system, where the prime mover may be remotely controllable; a continuous track transport system that includes a gear train having one or more gears connected with one or more other gears by a chain or toothed belt that is made at least in part of metal and/or plastic; a continuous track transport system that includes one or more drive gears in the form of a plastic sprocket; a continuous track transport system that includes a gear train having one or more gears made substantially, or completely, of plastic; a continuous track transport system that is interchangeable with one or more tires of an existing irrigation system; a continuous track transport system that can be installed on the same hubs of an existing irrigation system where tires were initially installed, or intended to be installed; a continuous track transport system configured to be mounted to a pair of hubs of an irrigation system, which may be a pivot irrigation system; a continuous track transport system which, when used by an irrigation system of a given weight, makes an impression in soil that has relatively greater area than the impression created by a pair of tires of the same irrigation system; a continuous track transport system which, for an irrigation system of a given weight, exerts a pressure on the soil that is less than that exerted by a pair of tires of the same irrigation system; a continuous track transport system that includes one or more replaceable grousers; a continuous track transport system that includes one or more plastic grousers; a continuous track transport system that includes a chain to which a plurality of grousers are attached; a continuous track transport system that includes a plastic chain to which one or more grousers are attached; a continuous track transport system that includes a plastic chain to which one or more plastic grousers are attached; a continuous track transport system with a chain, each link of the chain being integral with a respective grouser; a grouser, which may be plastic or metal, that includes one or more skids on each side to facilitate consistent ground contact with the grouser; a continuous track transport system with a plastic chain, each link of the plastic chain being integral with a respective grouser; a continuous track transport system that defines a soil contact area that is at least as long as a distance between two hub axes of the continuous track transport system; a continuous track transport system that defines a soil contact area which is substantially the same length as the continuous track transport system; a continuous track transport system with only a single soil contact portion; a continuous track transport system that defines a soil contact area, a substantial portion, or all, of which remains in contact with the soil at all times; a continuous track transport system that defines a soil contact area, where the soil contact area remains substantially the same size at all times; a continuous track transport system that defines a soil contact area that is generally rectangular in shape; a continuous track transport system that defines a soil contact area that is in the range of about 400 square inches to about 700 square inches; a continuous track transport system with an adjustable soil contact area; a continuous track transport system that includes an un-tensioned track having a plurality of grousers; a continuous track transport system having a generally rectangular outline; a continuous track transport system whose track creates a generally rectangularly shaped impression in soil, rather than a generally U-shaped impression created by one or more tires that could be used in place of the track, and the impression created by the track is substantially shallower than the U-shaped impression; and, a housing for a continuous track transport system, the housing can be removably attached to a frame or other structure of the continuous track transport system, and the housing can be made of metal and/or plastic, and may include one or more access panels.

With continuing reference now to further example embodiments, it should be understood that embodiments within the scope of this disclosure may include any one or more of the following elements, and features of elements, in any combination: a continuous track transport system; a glass-filled nylon frame; a glass-filled sprocket/gear combination; a glass-filled nylon track plate; a drive gear made of a combination of acetal and polytetrafluoroethylene (PTFE) (a synthetic fluoropolymer of tetrafluoroethylene); an acetal sprocket; a glass-filled nylon sprocket; a nylon hub; a plastic hub; an acetal hub bushing; a nylon rub rail; and a ductile iron hub with zinc chromate coating; a continuous track transport system that includes any combination of the foregoing components; a pivot irrigation system that includes the foregoing continuous track transport system.

In connection with the present disclosure, acetal refers to polyoxymethylene (POM), which is an engineering thermoplastic. As well, nylon is used herein as a generic designation for a particular family of synthetic polymers, namely, aliphatic or semi-aromatic polyamides.

As well, this disclosure embraces the embodiments disclosed herein both in respective assembled forms, and in respective kit forms. When in the form of a kit, the embodiment may be partly or completely disassembled, and the kit can be employed at the time of construction of an irrigation system, or as an after-market modification to an existing irrigation system.

Following is a non-exclusive list of embodiments within the scope of the invention. It should be understood that aspects of the various embodiments may be combined in other ways to define still further embodiments.

In a first example embodiment, a continuous track transport system includes a continuous track operably engaged with a pair of drive wheels, and each of the drive wheels is mounted, or mountable, to a corresponding hub of an irrigation system.

In a second example embodiment, a portion of an irrigation system has a continuous track transport system which includes a continuous track operably engaged with one or more drive wheels, and each of the one or more drive wheels is mounted, or mountable, to a corresponding hub of the portion of the irrigation system.

In a third example embodiment, a tower of a pivot irrigation system has a continuous track transport system which includes a continuous track operably engaged with one or more drive wheels, and each of the one or more drive wheels is mounted, or mountable, to a corresponding hub of the tower of the pivot irrigation system.

In a fourth example embodiment, a continuous track transport system includes a continuous track operably engaged with one or more drive wheels, where the one or more drive wheels are coupled to a drive motor by way of a gear train, and each of the one or more drive wheels is mounted, or mountable, to a corresponding hub of an irrigation system.

In a fifth example embodiment, a continuous track transport system includes a continuous track operably engaged with one or more drive wheels, where the one or more drive wheels are coupled to a drive motor by way of a gear train that includes one or more plastic gears and/or plastic sprockets, and each of the one or more drive wheels is mounted, or mountable, to a corresponding hub of an irrigation system.

In a sixth example embodiment, a continuous track transport system includes a continuous track operably engaged with one or more drive wheels, where the one or more drive wheels are coupled to a gear train that includes one or more gears, and where one of the gears or drive wheels is connected to another gear or drive wheel with a chain or toothed belt, and each of the one or more drive wheels is mounted, or mountable, to a corresponding hub of an irrigation system.

In a seventh example embodiment, a continuous track transport system includes an un-tensioned track operably engaged with one or more drive wheels.

In an eighth example embodiment, a continuous track transport system includes a track having a chain with a plurality of links, each of the links having a respective grouser attached thereto, where one or more of the links and/or one or more of the grousers are plastic.

In a ninth example embodiment, a continuous track transport system includes a continuous track operably engaged with a pair of drive wheels, and each of the drive wheels is mounted, or mountable, to a corresponding hub of an irrigation system.

In a tenth example embodiment, a portion of an irrigation system has a continuous track transport system which includes a continuous track operably engaged with one or more drive wheels, and each of the one or more drive wheels is mounted, or mountable, to a corresponding hub of the portion of the irrigation system.

In an eleventh example embodiment, a tower of a pivot irrigation system has a continuous track transport system which includes a continuous track operably engaged with one or more drive wheels, and each of the one or more drive wheels is mounted, or mountable, to a corresponding hub of the tower of the pivot irrigation system.

In a twelfth example embodiment, a continuous track transport system includes a continuous track operably engaged with one or more drive wheels, where the one or more drive wheels are coupled to a drive motor by way of a gear train, and each of the one or more drive wheels is mounted, or mountable, to a corresponding hub of an irrigation system.

In a thirteenth example embodiment, a continuous track transport system includes a continuous track operably engaged with one or more drive wheels, where the one or more drive wheels are coupled to a drive motor by way of a gear train that includes one or more plastic gears and/or plastic sprockets, and each of the one or more drive wheels is mounted, or mountable, to a corresponding hub of an irrigation system.

In a fourteenth example embodiment, a continuous track transport system includes a continuous track operably engaged with one or more drive wheels, where the one or more drive wheels are coupled to a gear train that includes one or more gears, and where one of the gears or drive wheels is connected to another gear or drive wheel with a chain or toothed belt, and each of the one or more drive wheels is mounted, or mountable, to a corresponding hub of an irrigation system.

In a fifteenth example embodiment, a continuous track transport system includes an un-tensioned track operably engaged with one or more drive wheels.

In a sixteenth example embodiment, a continuous track transport system includes a track having a chain with a plurality of links, each of the links having a respective grouser attached thereto, where one or more of the links and/or one or more of the grousers are plastic.

In a seventeenth example embodiment, a continuous track transport system includes a continuous track that includes a plurality of track plates connected to each other, and the track plates are made of glass-filled nylon.

In an eighteenth example embodiment, a continuous track transport system includes a pair of sprocket/gear components, each of which is made of glass-filled nylon.

In a nineteenth example embodiment, a continuous track transport system includes first and second frame portions made of glass-filled nylon.

In a twentieth example embodiment, a continuous track transport system includes a drive gear that is made of a blend of acetal and PTFE.

In a twenty-first example embodiment, a continuous track transport system includes a sprocket bushing and/or hub bushing made of acetal.

In a twenty-second example embodiment, a continuous track transport system includes a rub rail made of nylon.

In a twenty-third example embodiment, a continuous track transport system includes a hub made of ductile iron and coated with zinc chromate, or the hub can be plastic or nylon.

In a twenty-fourth example embodiment, a continuous track transport includes any combination of the components recited in the aforementioned seventh example embodiment.

In a twenty-fifth example embodiment, a continuous track transport includes all the components recited in the aforementioned seventeenth through twenty fourth example embodiments.

BRIEF DESCRIPTION OF THE DRAWINGS

The appended drawings contain figures of some example embodiments to further clarify various aspects of the present disclosure. It will be appreciated that these drawings depict only some embodiments of the disclosure and are not intended to limit its scope in any way. The disclosure will be described and explained with additional specificity and detail through the use of the accompanying drawings in which:

FIGS. 35-40 are directed to an example track plate and cover of a CTTS.

DETAILED DESCRIPTION OF SOME EXAMPLE EMBODIMENTS

The present disclosure is generally concerned with irrigation systems and components. More specifically, at least some embodiments of the invention are concerned with an irrigation system, one example of which is a pivot irrigation system, that includes a continuous track transport system that enables the irrigation system to move throughout a field while largely, or completely, avoiding one or more of the problems associated with the use of transport systems that rely primarily on tires or wheels for movement of an associated irrigation system. Embodiments of the invention can be employed in a wide variety of applications and, accordingly, the scope of the invention is not limited to the example applications and structures disclosed herein.

A. Example Configuration and Operating Environment

Figure 1:
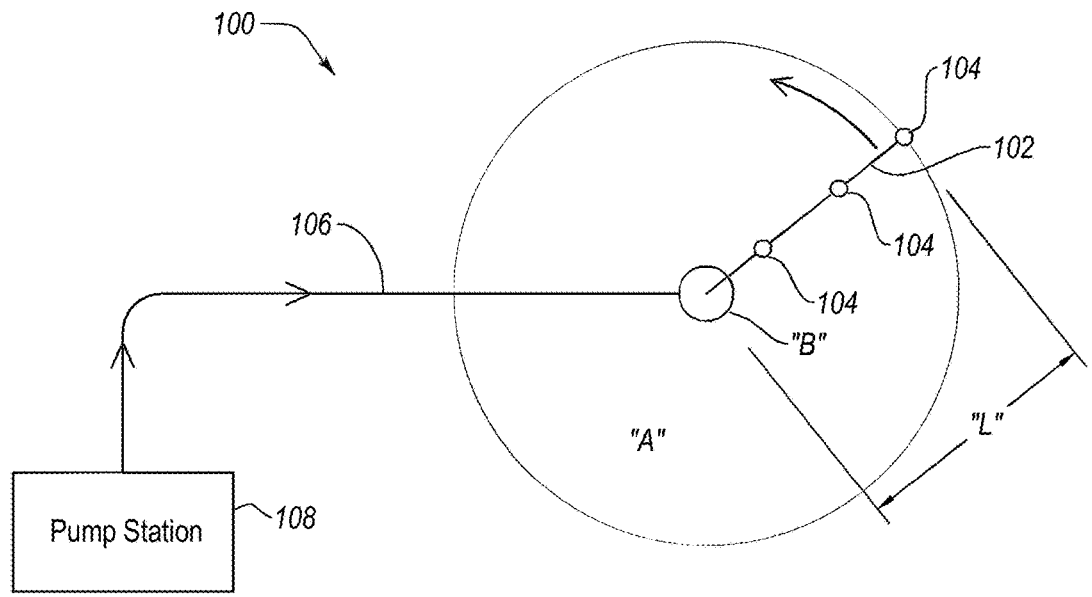
FIG. 1 is a schematic plan view of an arrangement of pivot irrigation systems.

With reference first to FIG. 1, details are provided concerning aspects of an example operating environment for at least some embodiments of the invention. In the example of FIG. 1, a pivot irrigation system 100 is indicated. In general, and as disclosed in more detail in FIG. 2, the pivot irrigation system 100 has a pivot arm 102 whose length "L" is defined by multiple lengths of watering pipe connected end to end and supported by a series of towers. The length "L" defines the radius of a circular area "A" that can be watered by nozzles 104 of the pivot irrigation system 100 as the pivot arm 102 rotates about a fixed point "B." Water can be supplied to the pivot arm 102 by way of a supply line 106 connected to a pump station 108 that communicates with a water source (not shown). Depending upon the size of a field or area to be watered, one or more pivot irrigation systems 100 may be provided.

Figure 2:
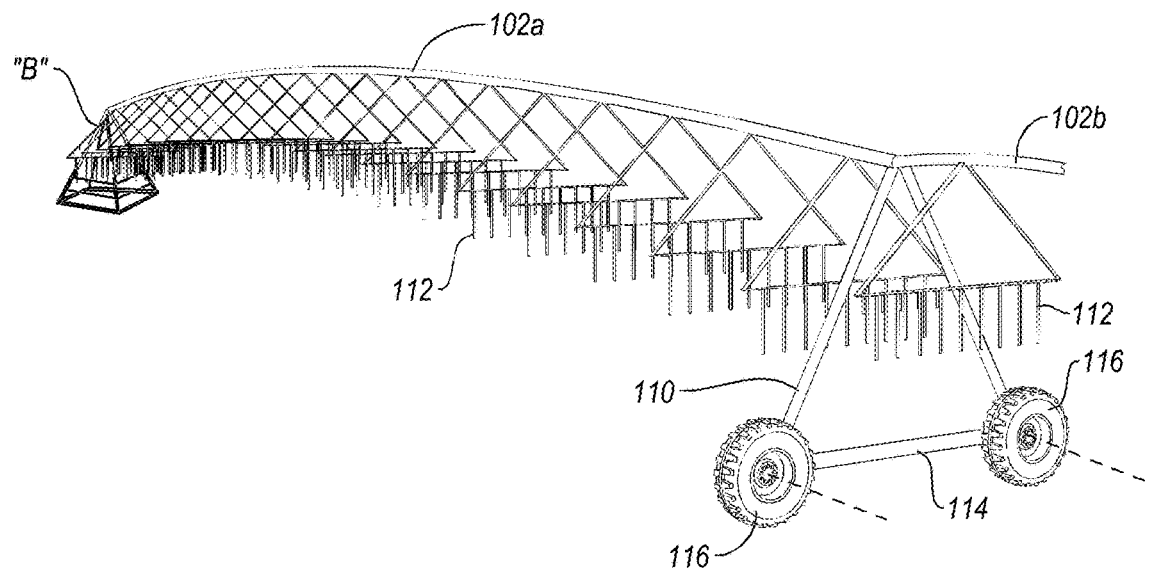
FIG. 2 discloses aspects of an example tower of a pivot irrigation system.

With continued attention to FIG. 1, and directing attention now to FIG. 2 as well, further details are provided concerning the example pivot irrigation system 100. As indicated there, the pivot irrigation system 100 may include one or more towers 110, which can be constructed in the form of a metal framework. The towers 110 support the individual pipe lengths 102a and 102b that form part of the length of the pivot arm 102. Each of the pipe lengths 102a and 102b may be in fluid communication with one or more nozzles 112, which can be pendant nozzles as indicated in FIG. 2, or any other type of nozzle. With continued reference to FIG. 2, one or more of the towers 110 may include a chassis 114 that is supported by a pair of tires 116. For at least the reasons set forth elsewhere herein however, the use of tires, such as tires 116, in irrigation systems has proven to be problematic.

Figure 3:
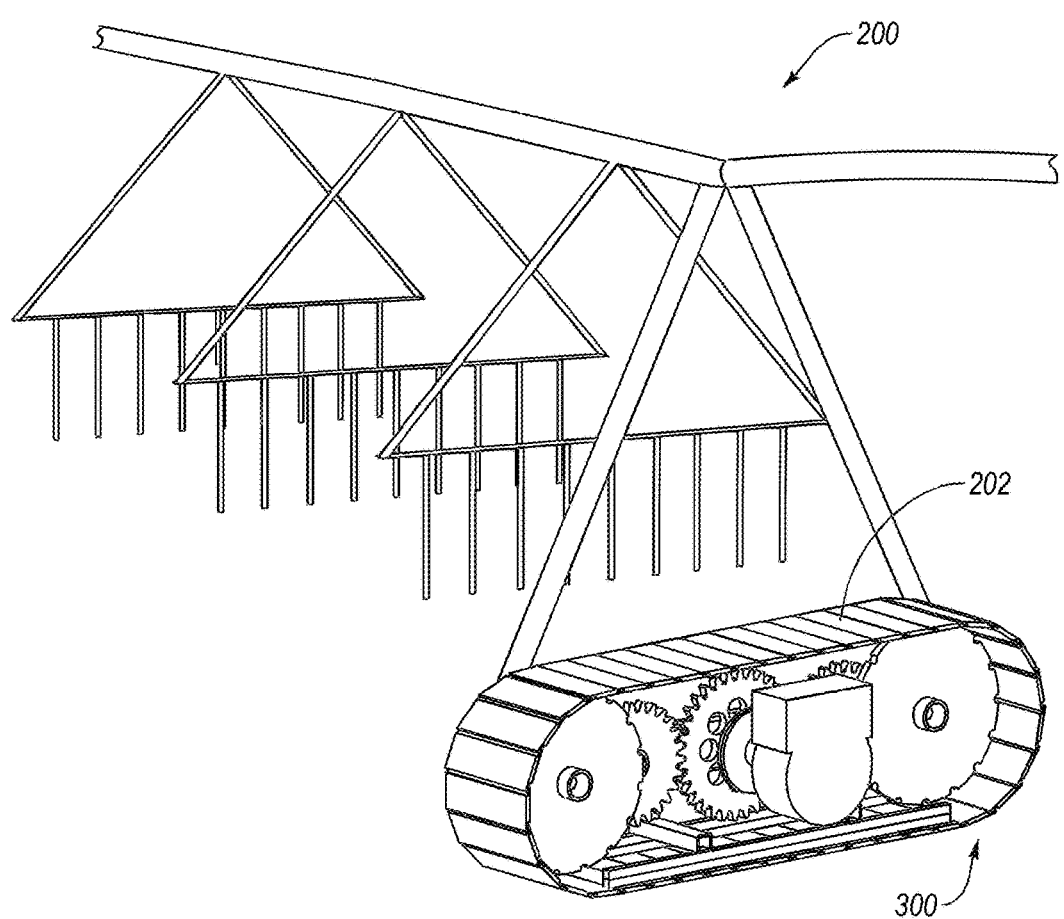
FIG. 3 discloses aspects of an example tower of a pivot irrigation system, where the tower includes a continuous track transport system.

Accordingly, attention is directed now to FIG. 3, where details concerning aspects of example embodiments of the invention are provided. The pivot irrigation system 200 may be similar, or identical, to the pivot irrigation system 100 except that instead of tires, such as tires 116, the pivot irrigation system 200 includes a continuous track transport system (CTTS), one example of which is denoted at 300.

Some, none, or all portions of the CTTS and its components may be coated with paint or other materials. At least some of such materials may serve to help prevent, or reduce, rust and corrosion. Surface treatments and textures may also be applied to portions of the CTTS.

Many of the elements employed in the foddering are constructed, either in whole or in part, of one or more metals. Suitable metals may include steels such as stainless steel, aluminum, and aluminum alloys, although the skilled person will understand that a variety of other metals may be employed as well and the scope of the invention is not limited to the foregoing examples. Where metal is employed in the construction of a component, the metal elements may take one or more forms including, but not limited to, square tube, rectangular tube, oval tube, polygonal tube, round tube, pipe, and solid, rather than tubular, forms of any of the foregoing. Metal elements can be extruded, forged, machined, or any of the foregoing. As disclosed in more detail elsewhere herein, materials such as plastics and rubber can be used either alone or in combination with one or more metals, in the construction of elements of the CTTS.

In general, where employed as a backfit or aftermarket item, the CTTS 300 can be readily attached to the chassis 202 using the hubs (not shown) to which the tires (see 116 in FIG. 2) were formerly mounted. Of course, the CTTS 300 can alternatively be included as an element of the pivot irrigation system 200 at the time of construction of the pivot irrigation system 200. In either case, the CTTS 300 eliminates the need for tires or wheels to transport the pivot irrigation system 200 throughout a field.

Figure 3A:
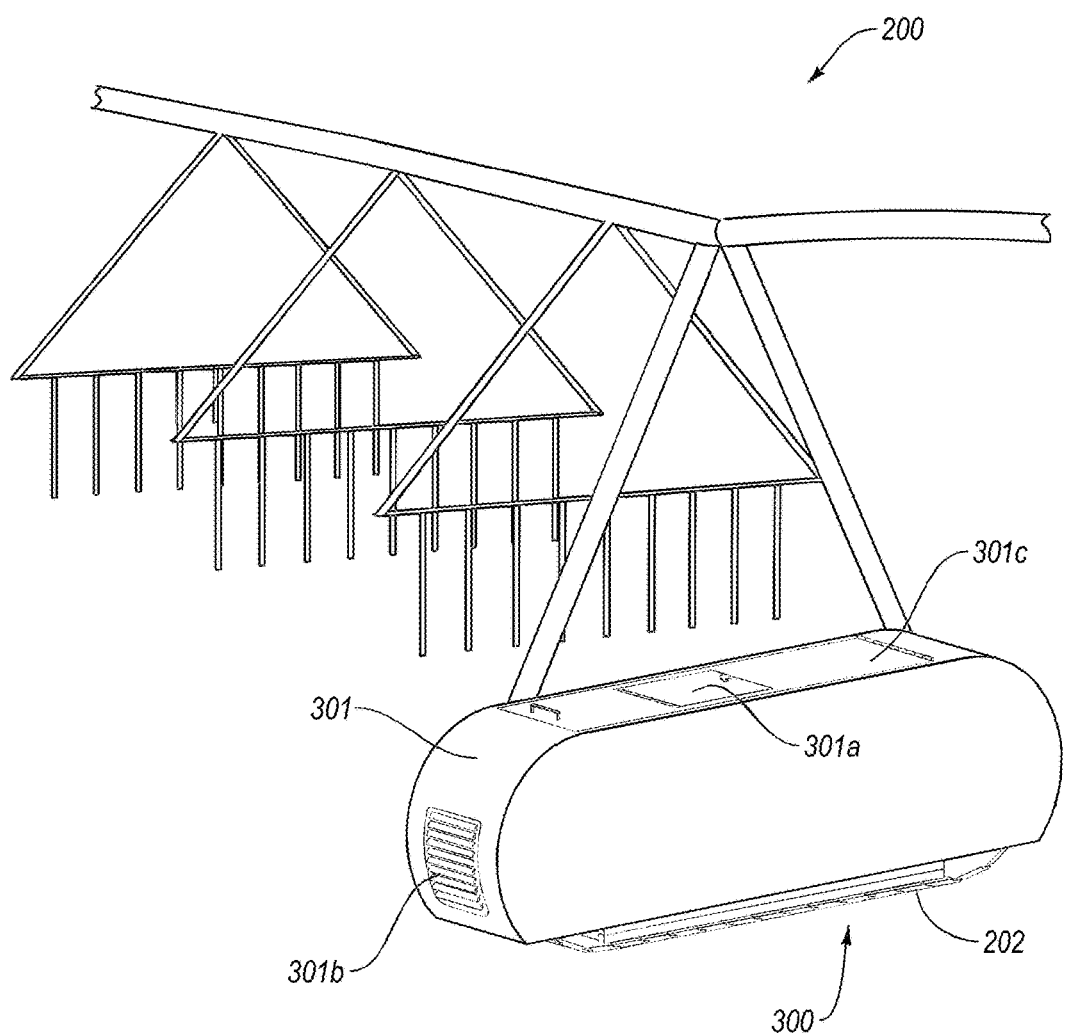
FIG. 3a discloses aspects of an example housing for a continuous track transport system.

With continued reference to FIG. 3, and directing attention briefly now to FIG. 3a, at least some embodiments of a CTTS, such as the example CTTS 300, may include a housing 301. Among other things, the housing 301 may help to prevent the entry of foreign matter and/or other materials into various components of the CTTS, such as the gear train (discussed below). As well, the housing 301 can provide components of the CTTS with a level of protection from environmental conditions such as sun and rain. The housing 301 can be made of any suitable materials, including metal and/or plastic, for example. As well, the housing 301 may be configured to be removably attached to a frame and/or other structure of the CTTS 300. In at least some embodiments, the housing 301 includes one or more access panels 301a to enable a user to access CTTS components disposed within the housing 301 for maintenance, removal and/or repair. Further, the housing 301 may include one or more vents 301b that enable air movement through the housing 301. Finally, in addition, or as an alternative to, the access panel(s) 301a, the housing 301 may include a cover 301c, which may be hinged, that a user can open so as to access CTTS components that are disposed within the housing 301.

Figure 3B:
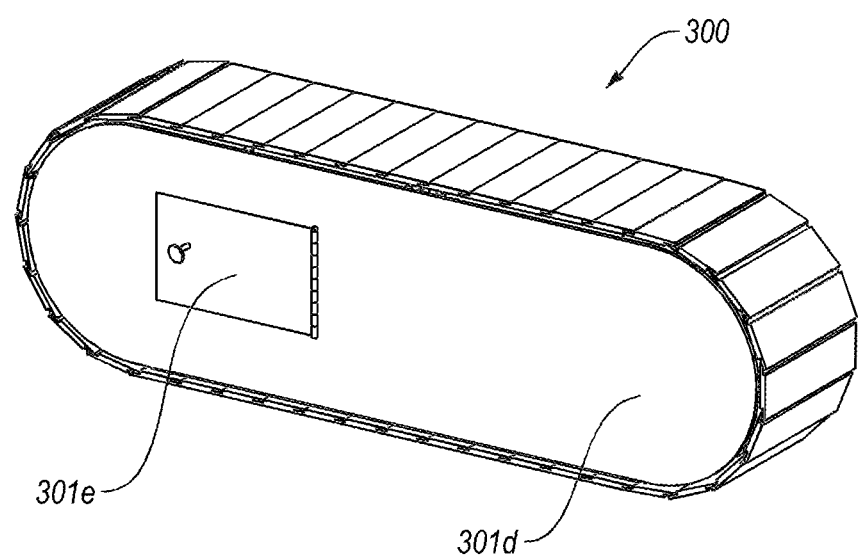
FIG. 3b discloses aspects of an example shield for a continuous track transport system.

With continued reference to FIGS. 3 and 3a, and directing attention briefly now to FIG. 3b, a shield 301d may be provided that can be used in addition, or as an alternative, to the housing 301. In general, the shield 301d can cover all, or part, of the CTTS components, such as the gear train (discussed below) for example. In this way, the shield 301d can help prevent foreign material from entering the gear train and/or other components of the CTTS. The shield 301d can be made of the same or similar materials as the housing 301, although that is not required. As well, the shield 301d can be removably attached to structural or other elements of the CTTS, with bolts or screws for example. In some embodiments, the shield 301d may include one or more access panels 301e that enable a user to gain access to components of the CTTS for inspection, repair and/or replacement, for example.

B. Aspects of Some Example Embodiments Continuous Track

Figure 4:
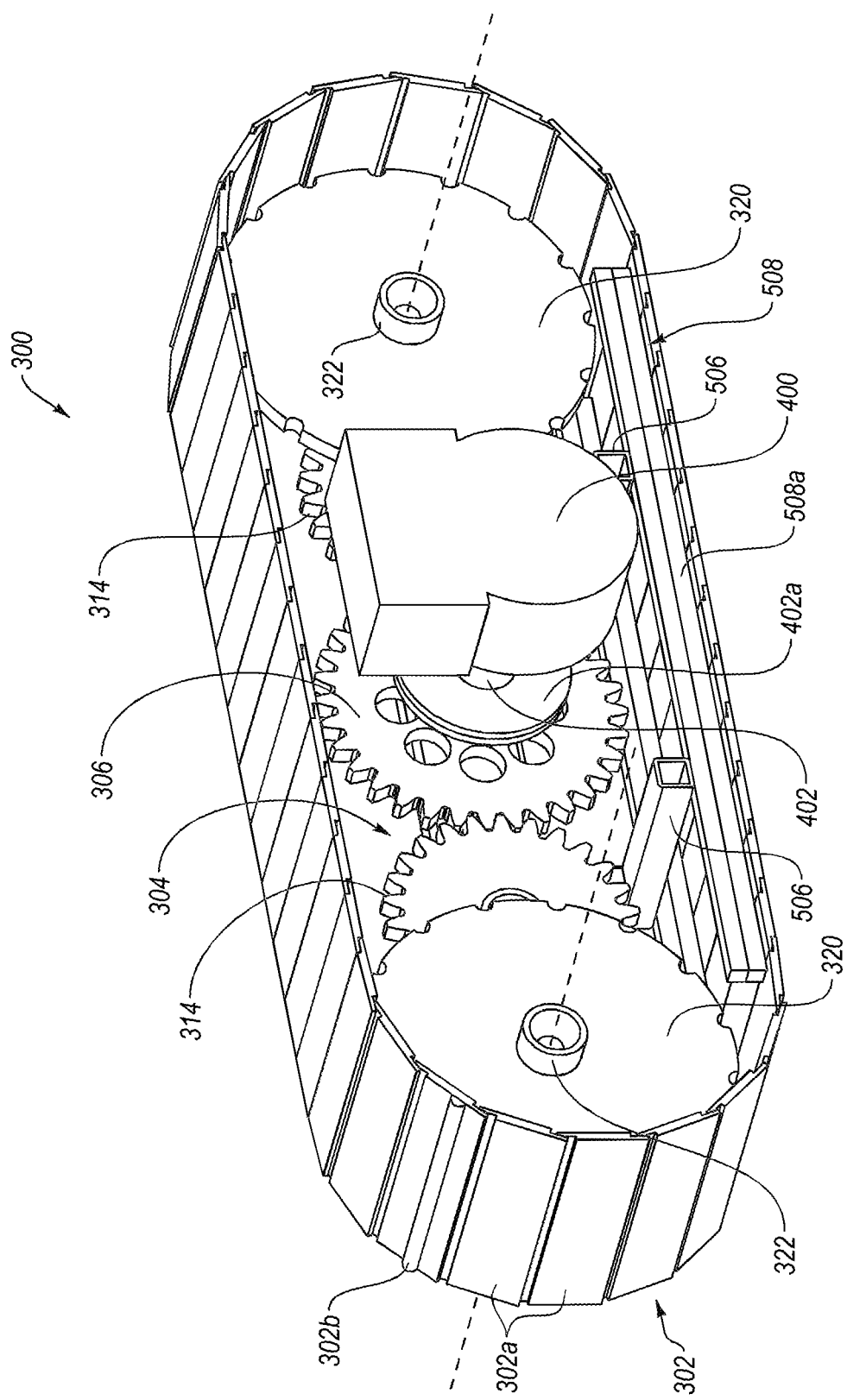
FIG. 4 is a right side perspective view of an example continuous track transport system.

With continued attention to FIG. 3, and directing attention as well to FIGS. 4-7, further details are provided concerning the example CTTS 300. As indicated in those Figures, the CTTS 300 may include a continuous track 302 that comprises a plurality of track elements, which can take the form of grousers 302a, connected together in such a way that an angle between successive grousers 302a is variable and enables one or more portions of the track 302 to assume a curved configuration, as shown in FIGS. 4 and 5 for example. In general, the example CTTS 300 may have a generally rectangular outline and, as such, may have a relatively smaller vertical dimension than triangular shaped drive systems.

In at least some embodiments, one or more of the grousers 302a include one or more cleats 302b. The cleat(s) 302b, when present, can help to improve traction and soil contact of the continuous track 302 as it moves over terrain. The cleats 302b can be integrally formed with respective grousers 302, permanently attached to respective grousers 302, or may be removably attached to respective grousers 302 so that the cleats 302b can be replaced when worn, or to suit operating conditions. For example, a grouser that is suitable for use in sandy soil may not be well suited for use in clay soil.

The grousers 302a and cleats 302b can be made of any suitable material, examples of which include plastic, rubber, metal, or any combination of these. Moreover, the grouser 302a and its corresponding cleat 302b can be the same material as each other, but that is not required. More generally, a cleat 302b of any of the aforementioned materials can be employed together with a grouser 302a made of any of these materials, and the scope of the invention is not limited to any particular material(s) or combination(s) thereof.

In some cases, the grousers 302a can be made of recycled plastic, examples of which include, but are not limited to, the ultra-high-molecular-weight polyethylene (UHMWPE) that is sold by Quadrant Plastics under the trade name 'Tivar ECO.' Such plastics may also be known as high-modulus polyethylene, (HMPE), or high-performance polyethylene (HPPE). Other plastics, or non-plastic materials, can alternatively be used for the grousers 302a.

Finally, it will be appreciated that a variety of different continuous track 302 configurations can be defined. Thus, aspects such as the size, shape, and number of the grousers 302a can be selected as desired to define a continuous track 302 of a desired configuration. Further details concerning example grousers and an associated chain are discussed elsewhere herein.

C. Aspects of Some Example Embodiments—Gear Trains

Figure 6:
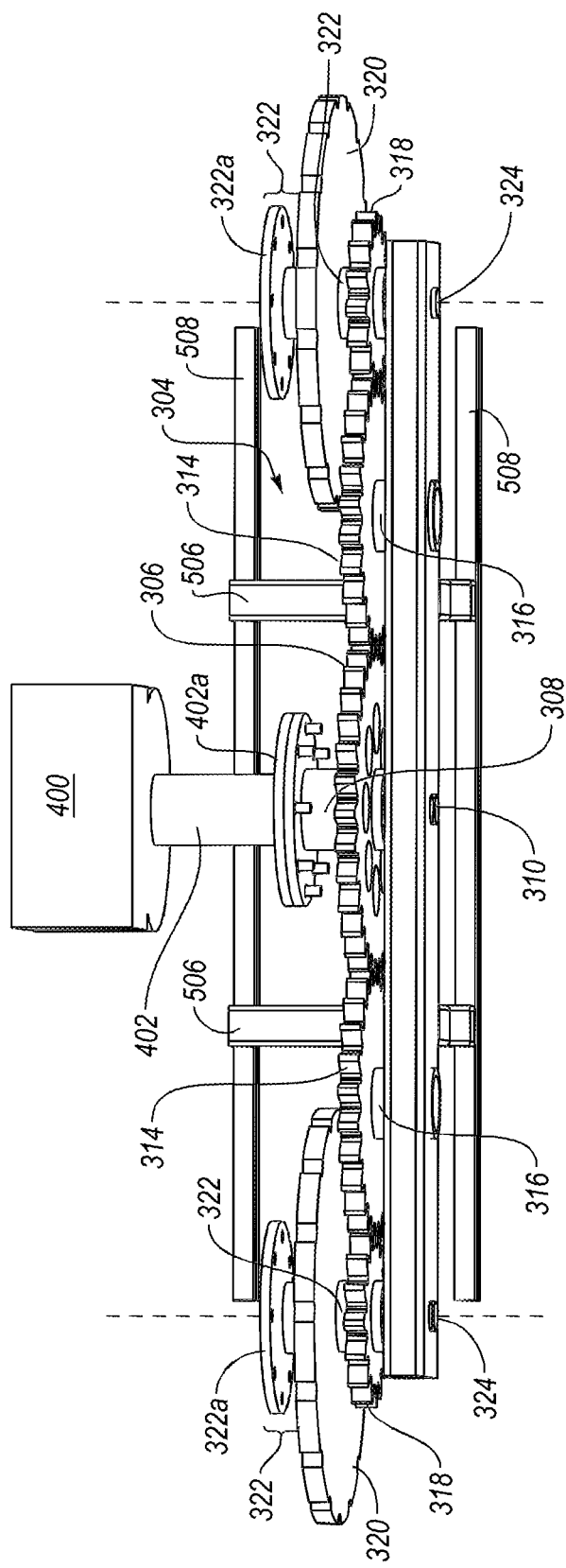
FIG. 6 is a top view of an example continuous track transport system.

As further indicated in the Figures, the CTTS 300 may include a gear train 304, part or all of which can be disposed within an envelope defined by the continuous track 302. As best shown in FIG. 6, the gears, discussed below, of the gear train 304 may all reside in substantially the same lateral plane so as to form a substantially linear gear train configuration. This configuration is provided by example only however, and other embodiments may employ a non-linear gear train configuration.

In the example illustrated in FIGS. 4-7, the gear train 304 includes a drive gear 306, which can be plastic or metal, or a combination of the two. A prime mover 400, such as an electric motor for example, includes a hub 402 with a flange 402a. The prime mover 400 may be provided as part of the CTTS 300, or may be existing equipment on an irrigation system chassis to which the CTTS 300 is to be mounted. With reference to FIGS. 5d and 6 in particular, the drive gear 306 may be mounted, such as by bolting for example, to a flange 308a of a drive hub 308. The drive hub 308 further includes a flange 308b configured to be removably attached, such as with bolts for example, to corresponding flange 402a of the hub 402. In this way, the CTTS 300 can be readily attached to, and detached from, the prime mover 400.

Figure 5A:
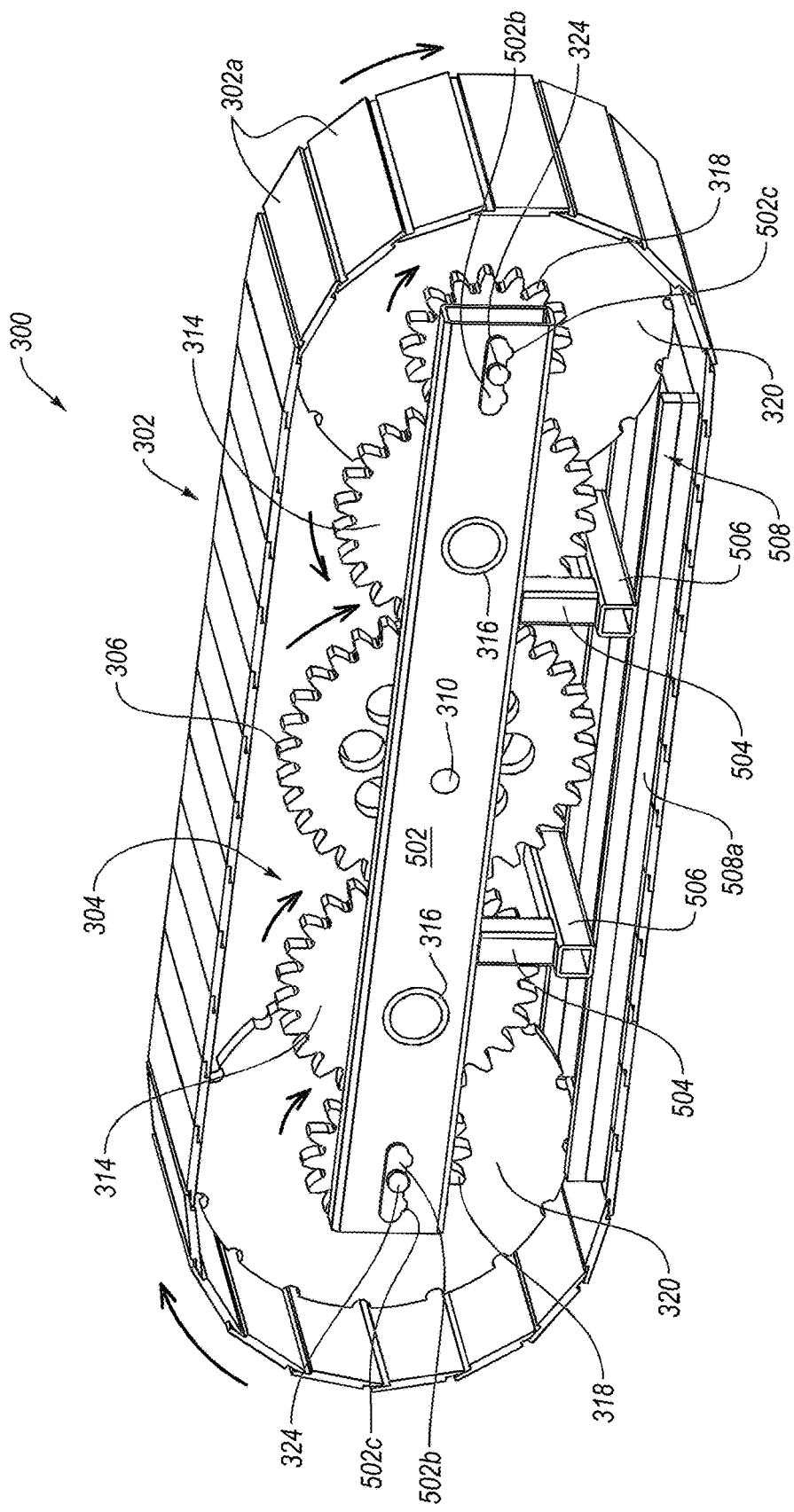
FIG. 5a is a left side perspective view of an example continuous track transport system.
Figure 5B:
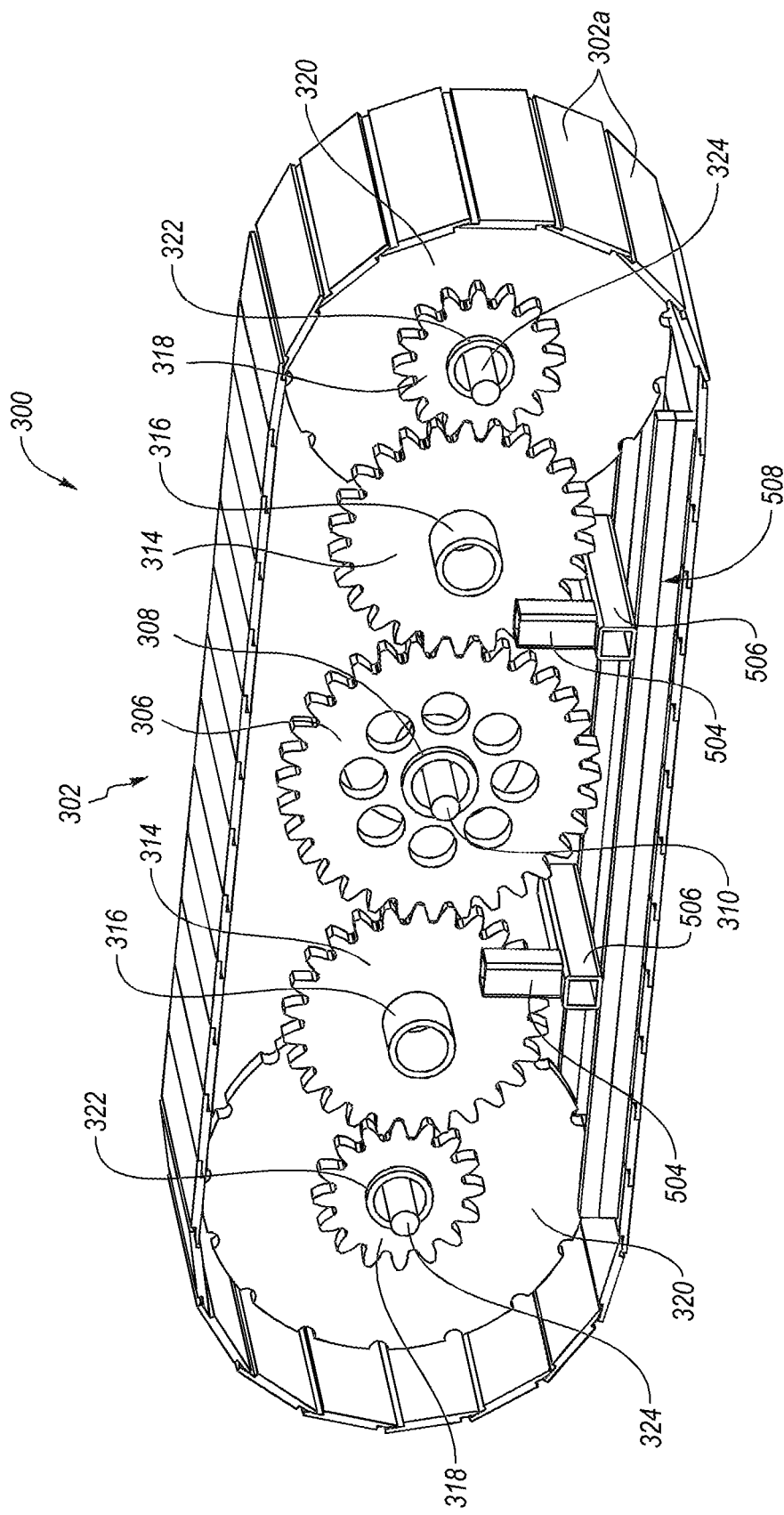
FIG. 5b is a partial left side perspective view of an example continuous track transport system, with part of the frame removed for clarity.
Figure 5C:
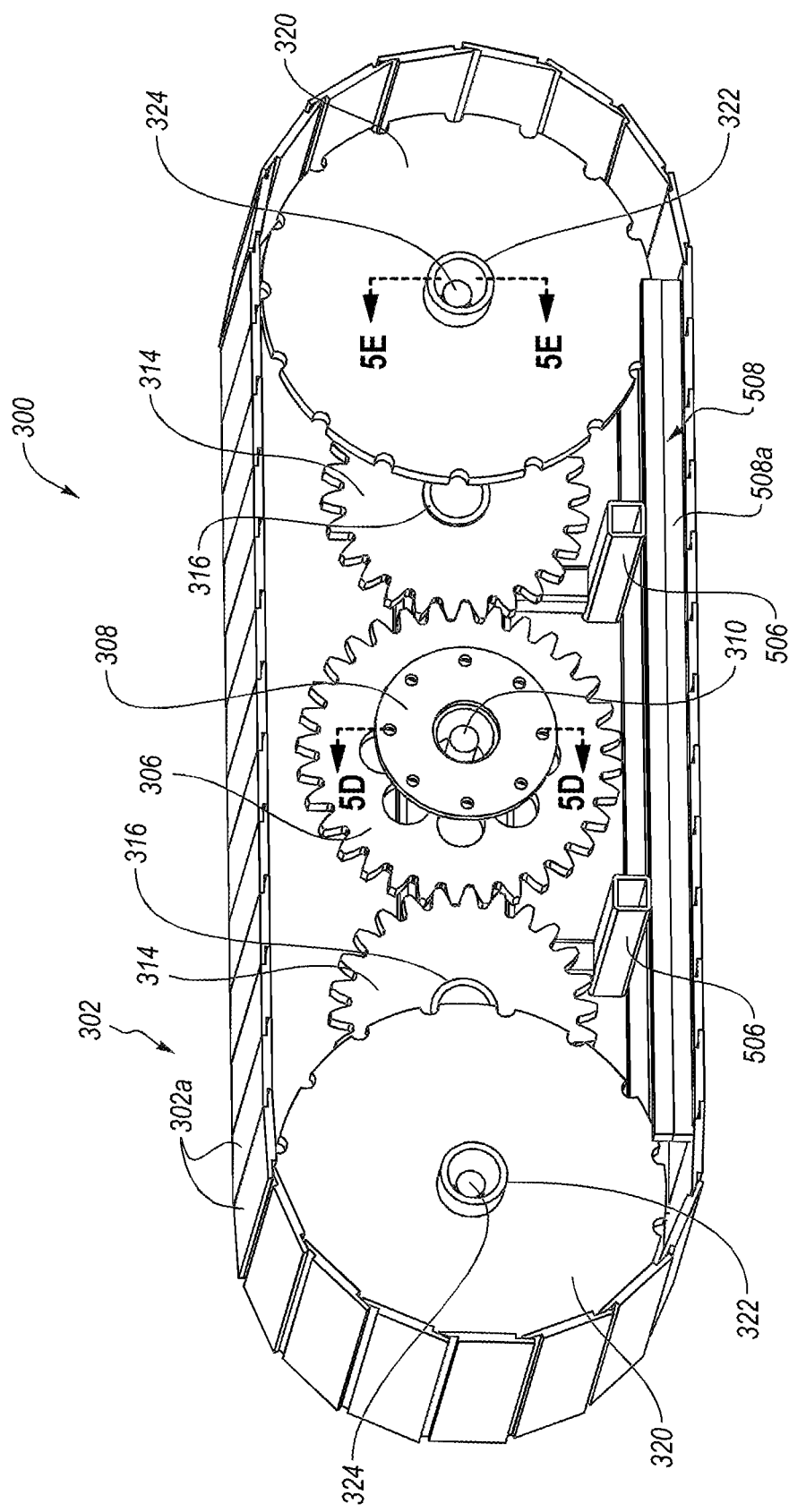
FIG. 5c is a partial right side perspective view of an example continuous track transport system, with the motor removed for clarity.
Figure 5D:
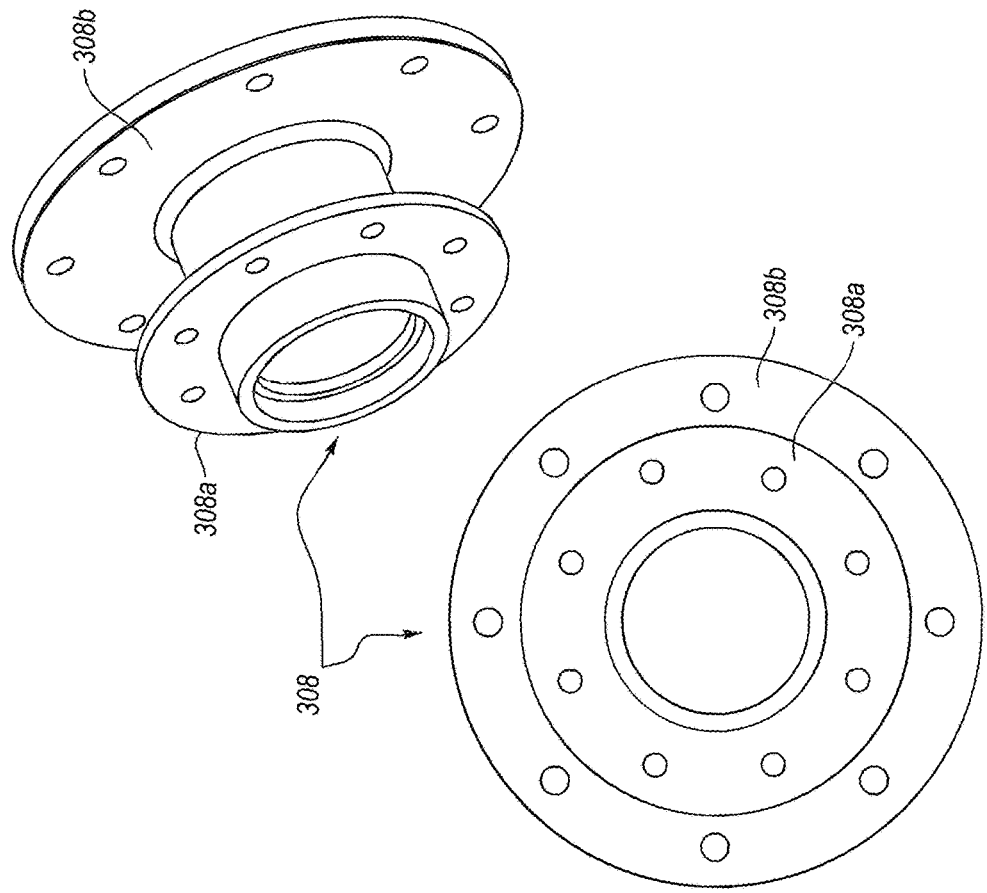
FIG. 5d is a partial section view of an example drive hub.
Figure 5D:
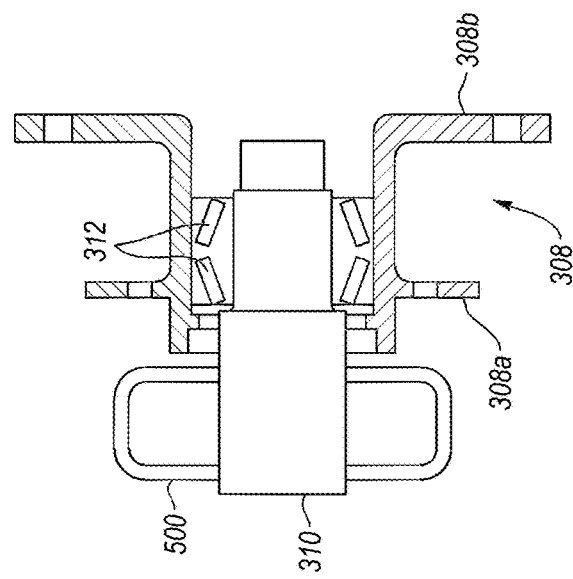

The drive hub 308, in turn, is mounted to a shaft 310, which may have a stepped configuration as shown in FIG. 5d. As discussed in further detail below, the shaft 310 may fixed to a frame 500 (discussed below) in such a way that the drive hub 308 and, thus, the drive gear 306, rotates about the shaft 310. To this end, one or more bearings 312 may be provided within the drive hub 308 to rotatably support the drive hub 308 as it rotates about the shaft 310. In one embodiment, the bearings 312 are double row tapered bearings configured to accept both axial and radial loading components. Other bearings may alternatively be employed however. In one particular embodiment, the shaft 310 is made of hot-rolled steel, such as hot-rolled steel conforming to ASTM 1018, although other materials can alternatively be employed. As well, the shaft 310 may be about 2.25 inches in diameter, and about 7 inches long, although different dimensions for the shaft 310 outside diameter and length can alternatively be implemented.

In addition to the drive gear 306, and with continued reference to FIGS. 4-7, the example gear train 304 may include one or more transfer gears 314 that engage the drive gear 306. The transfer gears 314 may be substantially the same size and configuration as each other, and can be sized such that a single (1) rotation of the drive gear 306 causes >1 rotation of each of the transfer gears 314, although this configuration is provided by way of example only and is not intended to limit the scope of the invention.

The transfer gears 314 can be mounted to, and rotate about, respective shafts 316. One or both of the shafts 316 can be permanently, or detachably, attached to the frame 500 (discussed below) such that the shaft 316 is fixed and the transfer gear 314 rotates about the fixed shaft 316. In one alternative arrangement, the shafts 316 can be rotatably supported by the frame 500, such as by way of bearings for example, so that the transfer gear 314 and shaft 316 rotate in unison with each other.

In one particular embodiment, one or both of the shafts 316 are made of round carbon steel tube, such as carbon steel tube conforming to ASTM A-513—Type 5 (1026 DOM), although other materials can alternatively be employed. One or both of the shafts 316 may be about 3.5 inches in outside diameter, and about 4 inches long, although different dimensions for the shaft 316 outside diameter and length can alternatively be implemented.

As well, in one particular example embodiment, one or more transfer gears 314 are made of plastic. In this example embodiment, no bearings are required since the plastic transfer gear 314 is self-lubricating as it rotates about the shaft 316. Among other things, this bearing-less configuration eliminates a possible failure mechanism and maintenance burden, and reduces the overall weight and cost of the gear train 304. One or both of the plastic transfer gears 314 may be paired with a spacer (not shown) situated between the transfer gear 314 and the frame 500 to prevent rubbing of the transfer gear 314 on the frame 500. In alternative to this arrangement, one or both of the transfer gears 314, which may or may not be plastic, includes a bearing (not shown) that has been press fit into the transfer gear 314. This bearing can provide radial and/or axial support to the transfer gear 314 as the transfer gear 314 rotates about the corresponding shaft 316.

Figure 5E:
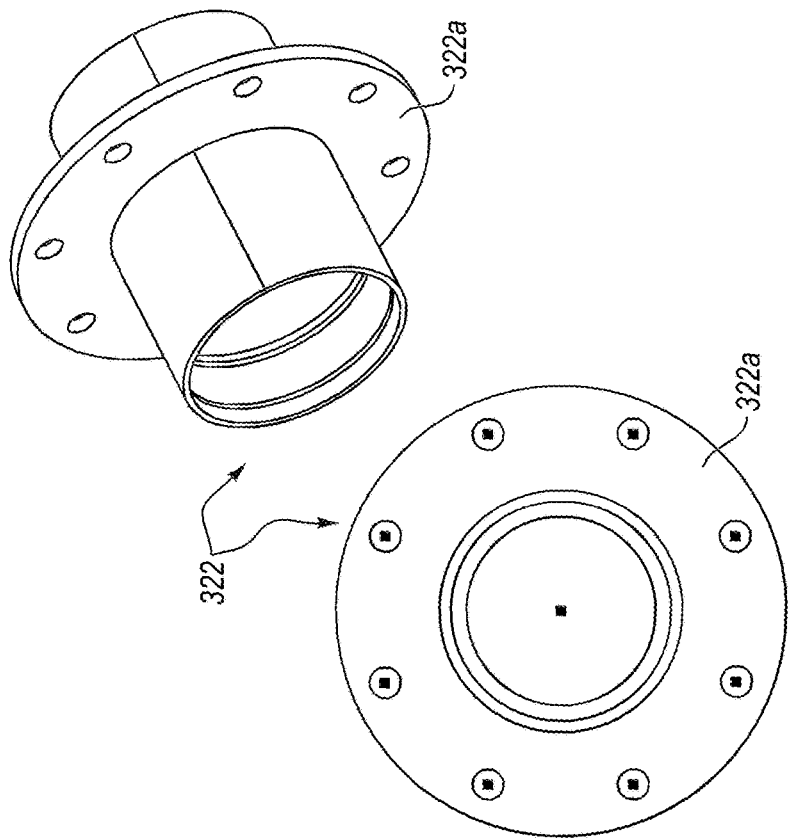
FIG. 5e is a partial section view of an example axle hub.
Figure 5E:
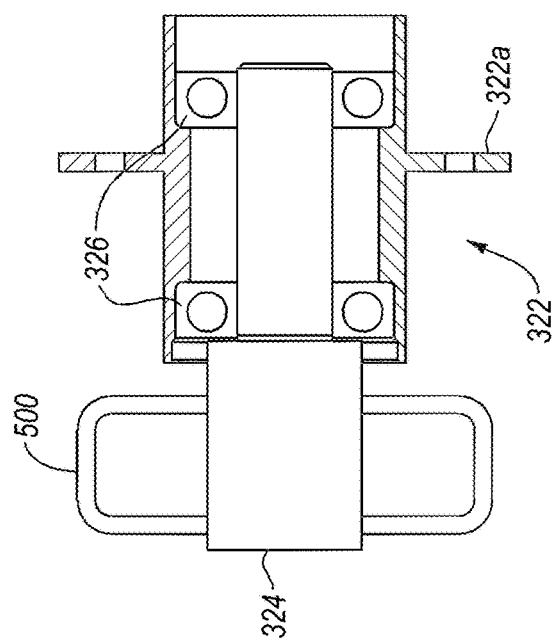

With continuing reference FIGS. 4-7, and particular reference to FIG. 5e, the gear train 304 also includes one or more driven gears 318 that each engage a respective transfer gear 314. As well, the driven gears 318 are each connected to a respective drive wheel 320 such that an input to the drive gear 306 is transferred to the driven gears 318 and, accordingly, causes a corresponding rotation of the drive wheels 320.

More specifically, an axle hub 322 is provided that includes a flange 322a to which the driven gear 318 and drive wheel 320 are bolted. In the example of FIG. 5e, the driven gear 318 and drive wheel 320 may be bolted to the left-hand side of the flange 322a, and the right-hand side of the flange 322a may be bolted to a corresponding flange of a chassis hub, as discussed elsewhere herein. In some embodiments, the axle hub 322 is made of steel that conforms to ASTM 1020, although other steels can alternatively be used. The axle hub 322, in turn, is mounted to a shaft 324, which may have a stepped configuration as shown in FIG. 5e. In one particular embodiment, the shaft 324 is made of hot-rolled steel, such as hot-rolled steel conforming to ASTM 1018, although other materials can alternatively be employed. One or both of the shafts 324 may be about 2.25 inches in diameter, and about 7 inches long, although different dimensions for the shaft diameter and length can alternatively be implemented.

As discussed in further detail below, the shaft 324 may be fixed to a frame 500 (discussed below) in such a way that the axle hub 322 and, thus, the driven gear 318 and drive wheel 320, rotates about the shaft 324. To this end, one or more bearings 326 may be provided within the axle hub 322 to rotatably support the axle hub 322 as it rotates about the shaft 324. In one embodiment, the bearings 326 are configured to accept a radial loading component. Other bearings may alternatively be employed however.

Because the drive wheels 320 are each engaged with the continuous track 302 (see, e.g., FIG. 8b), rotation of the drive wheels 320 causes a corresponding movement of the continuous track 302, namely, clockwise in the example of FIGS. 5a-5c. In at least some embodiments, one or both of the drive wheels 320 take the form of a sprocket. The sprocket can be made of plastic and, in one particular example embodiment, is in the range of about 14 inches to about 18 inches in diameter, with a thickness in a range of about ¾ of an inch to about 1¼ inches. In one more particular example, the sprocket is about 16 inches in diameter, and about 1 inch thick. The foregoing are presented only by way of example however, and the scope of the invention is not limited to these dimensions or associated aspect ratios. As in the case of the drive wheels 320, one or both of the driven gears 318 can be partly, or completely, made of plastic, although that is not required. More generally, at least the diameter and/or size and number of teeth of any combination of the gears in the gear train 304 can be varied as desired to achieve a particular gear ratio and/or other effects.

As best shown in FIGS. 5a-5c, the design and configuration of the gear train 304 is such that both of the transfer gears 314 and drive wheels 320 rotate in the same direction, for a given output direction of the drive gear 306. It can likewise be seen that a range of variations can be implemented to the CTTS 300. Thus, in some embodiments, at least some of the gears of the drive train 304 can be omitted.

For example, the transfer gears 314 can both be omitted, and the drive gear 306 directly connected, or coupled by a chain or toothed belt for example, to the driven gears 318. With this configuration, the CTTS 300 will still implement a desired rotation of the drive wheels 320. Another aspect of this configuration is that the overall length of the gear train 304 is shortened and this, in turn, can enable a relatively shorter track 302 and correspondingly smaller soil contact area. This smaller soil contact area may be desirable where, for example, the CTTS 300 is used with a relatively small tower.

As another example of a modification that could be made to the drive train 304, the driven gears 318 could be omitted, and the transfer gears 314 each mounted to a respective axle hub 322, along with a respective drive wheel 320, and engaged directly, or by a chain or toothed belt, with the drive gear 306. In this arrangement, the direction of rotation of the drive wheels 320 would be opposite that indicated in FIGS. 5a-5c, assuming that the input provided by the drive gear 306 is the same as shown in FIGS. 5a-5c.

In yet another modification to the drive train 304, one transfer gear 314 and the associated driven gear 318 can be omitted, leaving only a single transfer gear 314 and associated driven gear 318. In this example arrangement, the input from the drive gear 306 is thus directed only to one of the drive wheels 320 and the other drive wheel 320 is only connected to the drive gear 306 by way of the track 302.

While the foregoing example modifications to the gear train 304 concern the omission of one or more gears, yet other modifications can be made to the drive train 304 that involve the addition of one or more gears. For example, one or more gears can be added so as to effectively increase the overall length of the gear train 304 and, correspondingly, the length of the track 302 and the soil contact area.

Figure 7:
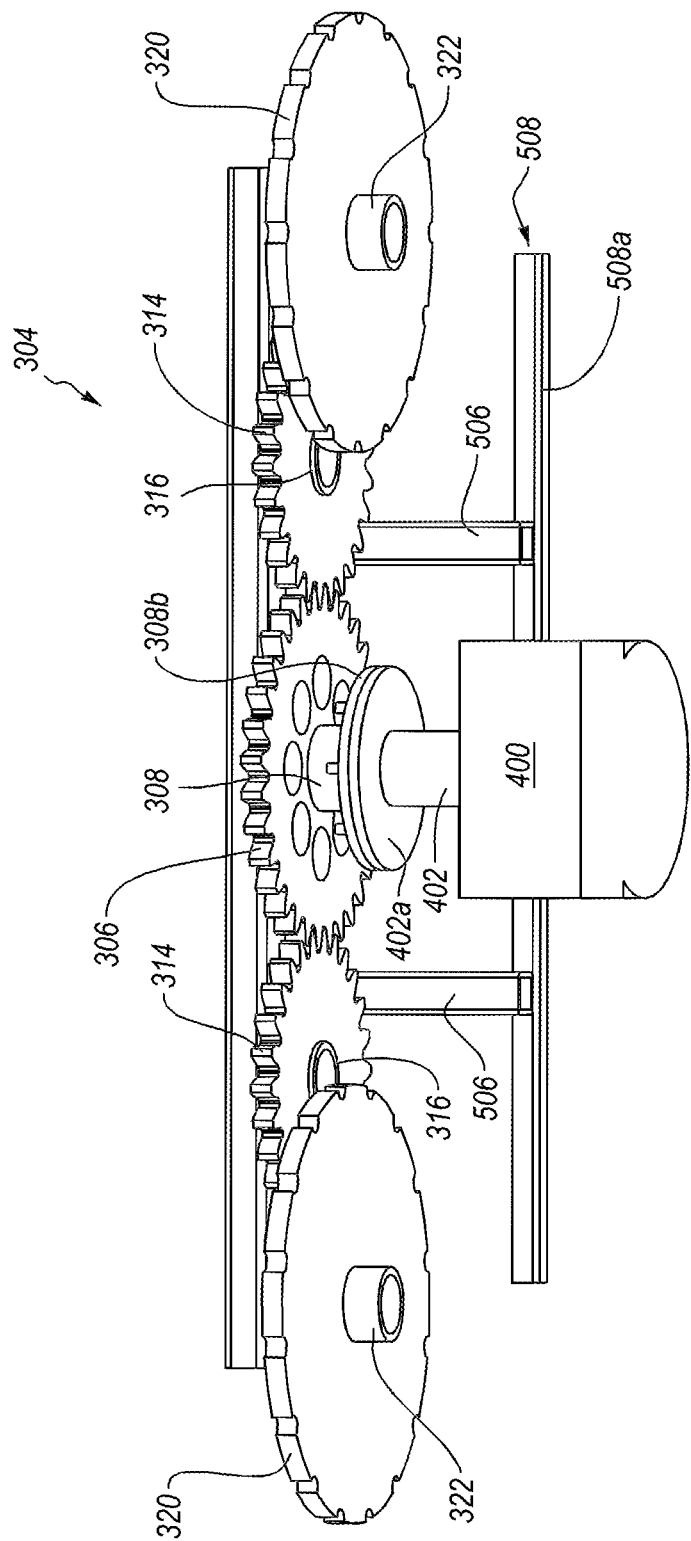
FIG. 7 is a bottom view of an example continuous track transport system.

It will also be apparent from FIGS. 5-7 that a desired output rotational speed of the driven gears 318, transfer gears 314, and drive wheels 320 can be obtained by selection of suitable gear sizes and arrangements of gears. With reference to the illustrative example of CTTS 300, the drive gear 306 is larger in diameter than either of the transfer gears 314 and the driven gears 318. Thus, a relatively low rotational speed input (which can be expressed as revolutions per minute, or RPM) to the drive gear 306 will result in a relatively higher rotational speed of the transfer gears 314, driven gears 318 and drive wheels 320. In this example, the transfer gears 314 not only convert the rotational motion of the drive gear 306 to a rotational motion of the driven gears 318, but also increase the rotational speed of the driven gears 318 relative to the rotational speed of the drive gear 306.

With the foregoing points in view, and with continued reference to FIGS. 5a-5c and FIGS. 6-7, one particular example embodiment of the drive train 304 includes gears of various specific sizes. More particularly, in this example embodiment, a drive gear 306, two transfer gears 314 and two driven gears 318 are provided. In this example, the drive gear 306 has a pitch diameter of about 16 inches and 32 teeth, the transfer gears 314 have a pitch diameter of about 13 inches and 26 teeth, and the driven gears 318 have a pitch diameter of about 8 inches and 16 teeth. The foregoing relations between pitch diameters and teeth can be used to select gears of yet other pitch diameters and tooth counts. However, the scope of the invention is not limited to the foregoing example nor to the foregoing relations and, accordingly, any other suitable gear configurations and relations can be employed.

As the foregoing discussion makes clear, movement of the continuous track 302 can be effected with a wide variety of different CTTS gearing arrangements and gear train configurations. Accordingly, the scope of the invention is not limited to the example arrangements and configurations disclosed herein.

In connection with the foregoing, it should be noted that any of the gears within the scope of this disclosure can be constructed of a variety of different materials. Thus, and in general, any of the disclosed gears, in any combination, can be made of plastic, or metal, for example. That is, any combination of one or more of the drive gear 306, transfer gears 314, driven gears 318, and drive wheels 320 may be made of plastic, or metal. Moreover, a gear train may include plastic gears exclusively, or metal gears exclusively, or may include a combination of plastic gears and metal gears. Metals that can be used in the construction of metal gears include, but are not limited to, steel, steel alloys, aluminum, and aluminum alloys.

In at least one embodiment, all the gears of the gear train are plastic. As discussed in more detail below, the plastic may be the same for each gear, or different types of plastic may be used in two or more different gears. Although, as discussed below, plastic gears may be advantageous in certain circumstances, they need not be used in all embodiments, or in any embodiment.

Lighter weight gear materials, such as plastic, for example, may be particularly useful in at least some applications as such materials can help reduce the overall weight of the CTTS, and also reduce the load imposed on the prime mover 400. Plastic gears may also be desirable due to their resistance to rust, corrosion, galling, seizing and other problems that may sometimes be associated with the use of certain metals and combinations of metals. Plastic gears may also be more weather resistant than metal gears. For example, some embodiments of plastic gears may include an additive or other material(s) that make the plastic gear resistant to ultraviolet (UV) light.

As well, plastic gears are relatively light and inexpensive when compared with steel gears of comparable dimensions and configurations. For example, some types of plastic are only about ⅐ the weight of steel. As well, plastic gears can be molded and thus avoid at least some processes, such as casting, for example, sometimes associated with the construction of metal gears. Moreover, any of the gears disclosed herein, whether plastic or metal, can include one or more lightning holes to achieve a further reduction in weight.

It should also be noted that where a gear train such as gear train 304 includes more than one plastic gear, different plastics can be used for different gears. For example, and with reference to two gears engaged with each other, one of the gears may be made of a first type of plastic and the other of the two gears may be made of a second type of plastic that is different from the first type of plastic. Depending upon the plastics selected, such a plastic-to-plastic engagement arrangement can enable a relative reduction in wear and friction as compared with an arrangement where both plastics are the same, or an arrangement where one gear is plastic and the other gear is metal.

The disclosed plastic gears can be formed by any of a variety of processes, or combinations of processes. Example production processes for plastic gears include, but are not limited to, any one or more of injection molding, extrusion, rotational molding, and blow molding. As well, the plastic gears can be cut from stock and then machined using methods such as turning, milling, drilling, shaping, and hobbing. A variety of factors can inform the design and production of the gears, whether made of plastic or other material(s). Examples of such factors include weather, soil types, humidity, topography, desired weight of the gear train, cost, friction properties, and reliability.

With the foregoing in view, following is a brief discussion of example plastics that can be used in the construction of various components of a gear train, one example of which is the gear train 304. For example, the drive wheels, driven gears, drive gear, and skids, or any combination of the foregoing, can be made of the same type of plastic. One example of such a plastic includes any plastic from the family of synthetic polymers known generically as aliphatic polyamides, and sometimes sold under the trade name 'nylon.'

In a more particular example, an aliphatic polymide that contains finely divided particles of molybdenum disulphide ($MoS_2$) may be especially well suited to some applications. One such plastic is sold by Quadrant Plastics under the trade name Nylatron® GSM. The presence of the $MoS_2$ may serve to enhance the load bearing capabilities of this plastic, while maintaining the impact resistance that is characteristic of aliphatic polymides.

Yet other components of one or more embodiments of a drive train may be made of a different plastic. For example, the transfer gears may be made of polyoxymethylene (POM). POM is a thermoplastic that can be used in parts that require high stiffness, low friction, and dimensional stability. It should be noted that POM is sometimes referred to as acetal, polyacetal, or polyformaldehyde. As well, POM may be sold under trade names such as Delrin, Celcon, Ramtal, Duracon and Hostaform, for example.

As the foregoing makes clear, a variety of different plastics can be employed in different embodiments of the invention. Accordingly, the scope of the invention is not limited to the use of any particular plastic, or combination of plastics.

D. Aspects of Some Example Embodiments Frame

With continued reference to FIGS. 4-7, at least some embodiments of the CTTS 300 include a frame 500. The frame 500 may include a support arm 502 that supports respective shafts, discussed elsewhere herein, to which the drive gear 306, transfer gears 314, and driven gears 318 are mounted, as shown in FIGS. 5a-5c for example. In general then, the support arm 502 may support shaft 310, one or more shafts 316, and one or more shafts 324.

In at least some embodiments, the support arm 502 includes an array of pre-formed holes that enable a user to define a desired gear train 304 configuration. By way of example, the support arm 502 can include a plurality of openings, such as four or more, for example, which are each configured to receive a shaft 324. In this way, a user can position a shaft 324 in a variety of different locations and thereby customize the gear train configuration 304 to suit a particular need or application. Additionally, or alternatively, and as illustrated by the example of FIG. 5a, the support arm 502 can include one or more slots 502b, which can be vertically, horizontally, or angularly, oriented. Such slots 502b enable a shaft to be slid into a desired location, thereby permitting ready customization and/or adjustment of a drive train 304. Such slots 502b can include a plurality of cutouts 502c configured to receive a portion of a shaft, where each of the cutouts 502c defines a different respective shaft position. A locking bar not shown or other structure(s) can be used to retain a shaft in a particular cutout 502c until it is desired to remove the shaft from that cutout 502c.

With continued reference to FIGS. 4-7, further details will now be provided concerning the example frame 500. As shown in the Figures, a plurality of vertical support members 504 are connected to the support arm 502. Each of the vertical support members 504 rests on a respective cross-piece 506 that rests on a pair of parallel base members 508. One, some, or all of the support member 502, vertical support members 504, cross-pieces 506, and base members 508 may be in the form of tube or pipe, or may be in the form of a solid member. The various pieces and members of the frame 500 can be permanently, or removably, attached to each other in any suitable manner, such as, but not limited to, bolting, welding, or brazing, or any combination of the foregoing.

In at least some embodiments, the support arm 502, the support members 504, and/or the cross-pieces 506, or any combination of the foregoing, may be made of cold-formed carbon steel, such as the cold-formed carbon steel conforming with the ASTM A 500 specification, although other materials can alternatively be employed. In one particular embodiment, the cross-pieces 506 are 2"×2"×12" (long) square tube, although other sizes and configurations of materials can alternatively be used. In the same embodiment, and/or in other embodiments, the support arm 502 is 2"×6"×56" (long) rectangular tube, although other sizes and configurations of materials can alternatively be used. In yet other embodiments, one or more components of the frame 500, such as the support arm 502, for example, may be made of plastic, such as any of the plastics disclosed herein.

As best shown in FIGS. 4 and 5a-5c, some embodiments of the base members 508 are configured and arranged so that the base member 508 serves as a rub rail for the grousers 352 (and/or 302a) as the grousers 352 move underneath the base member 508. As well, the contact piece 508a can serve as a chain guide that limits, or prevents, lateral movement of the chain 360 (discussed below). The contact piece 508a may be made of a relatively rigid material that can support the weight of the gear train 304, but which is sufficiently soft that it does not cause undue wear on interior surfaces of the grousers 302a that it contacts. As well, the material of the contact piece 508a may be a relatively low-friction material. Examples of such materials for the contact pieces 508a include, but are not limited to, solid fluorocarbons such as polytetrafluoroethylene (PTFE) which may be sold under the Teflon® mark, and thermoplastics such as polyoxymethylene (POM) which may be sold under the Delrin® mark.

E. Aspects of Some Example Embodiments Irrigation System Chassis

Figure 8A:
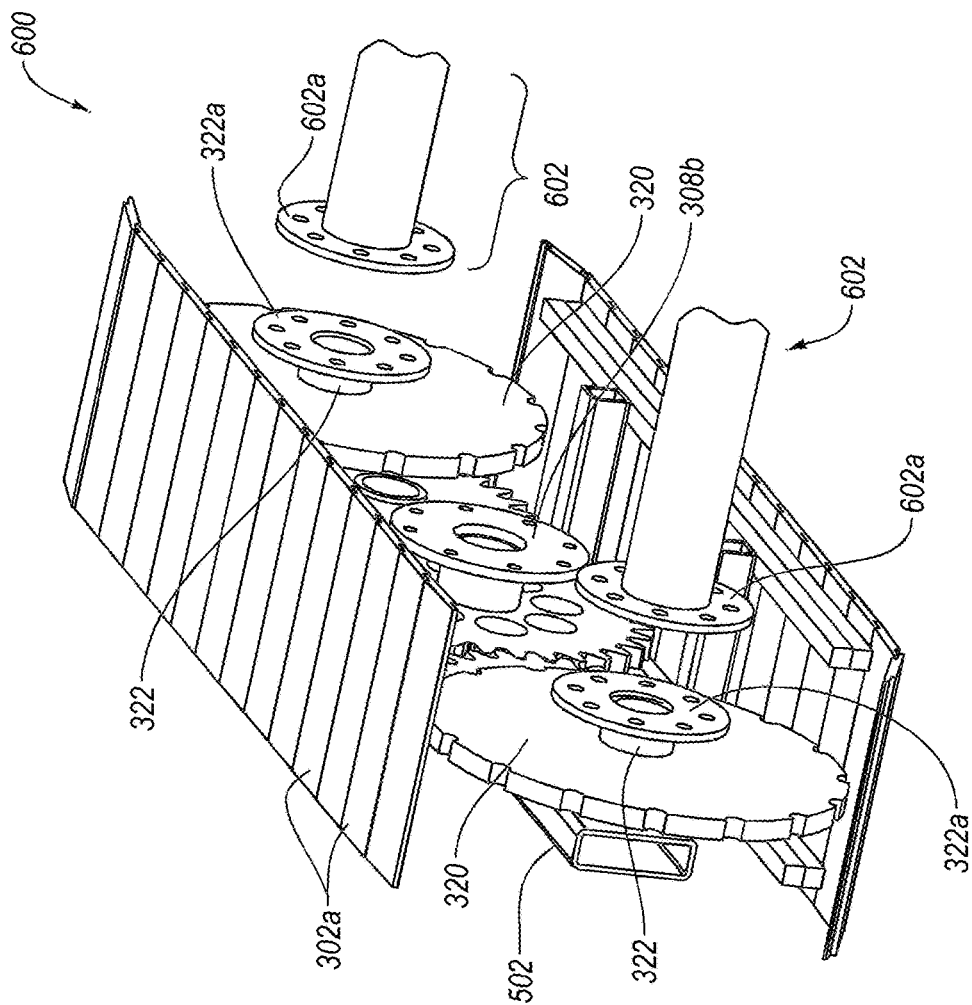
FIG. 8a is a side cutaway view showing an example interface between a continuous track transport system and a chassis of an irrigation system.

With reference briefly now to FIG. 8a, details are provided concerning an example interface between a system such as the CTTS 300 and a chassis 600 of an irrigation system, such as a pivot irrigation system, for example. The chassis 600 may be the same as, or similar to, chassis 114 (see FIG. 2), or may have another configuration.

In the example of FIG. 8, the flanges 322a of the axle hubs 322 of the CTTS 300, or another CTTS, are configured and arranged to be connected with corresponding chassis hubs 602 of the chassis 600. More particularly, the flanges 322a of the axle hubs 322 can be bolted, or otherwise attached, to flanges 602a of the chassis hubs 602. As a result of this configuration of the CTTS 300, it can be readily attached to, and detached from, the existing hubs of an irrigation system chassis. This configuration thus enables ready replacement of irrigation system tires with a CTTS, and also enables ready removal of the CTTS from the irrigation system chassis, should there be a need to do so. Of course, the scope of the invention is not limited to the use of hubs and/or flanges. More generally, any other structure(s) that enable ready attachment and detachment of a CTTS to/from an irrigation system chassis can alternatively be employed.

Figure 8B:
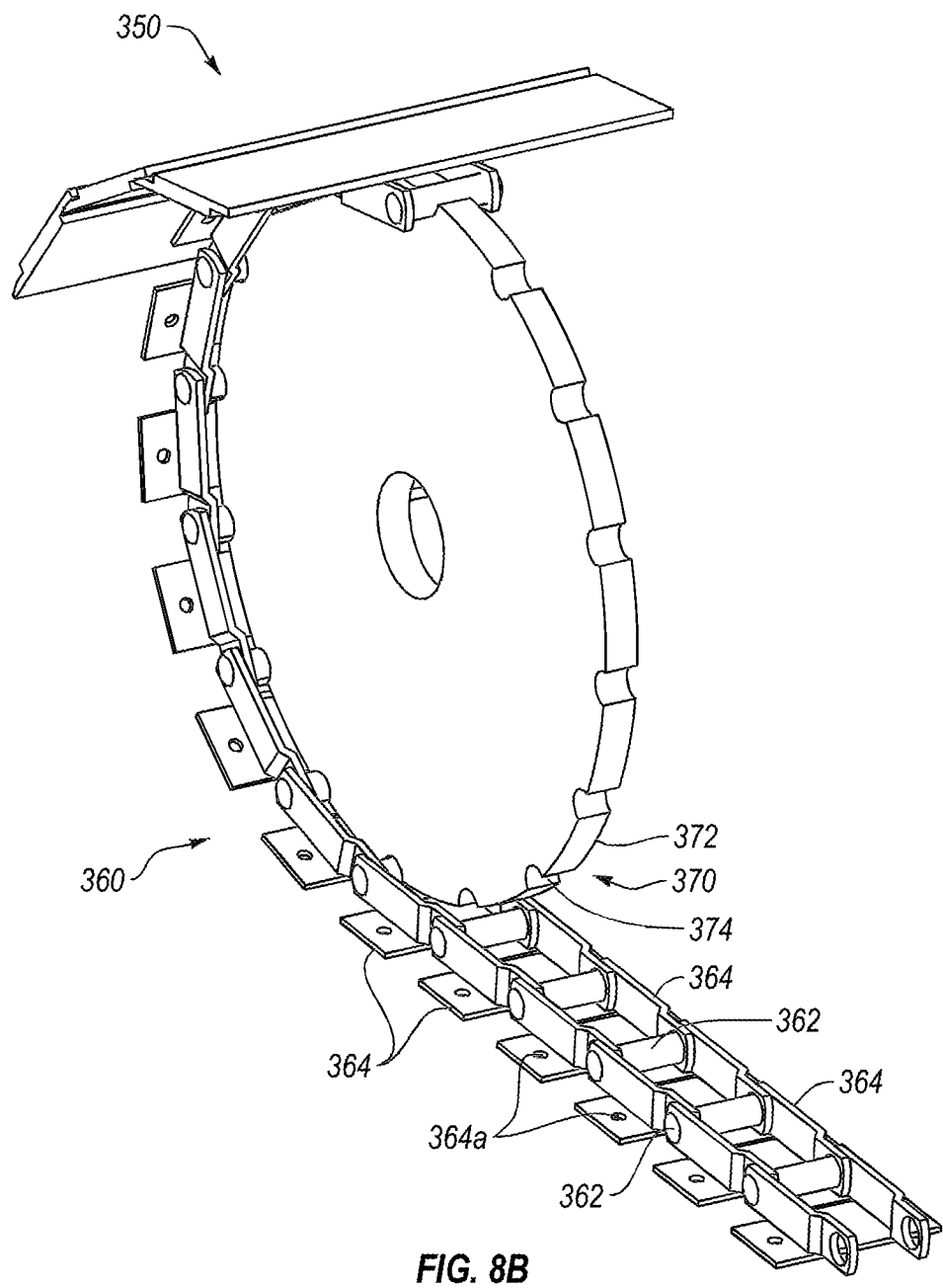
FIG. 8b is a detail view of a portion of an example chain and grousers.
Figure 8C:
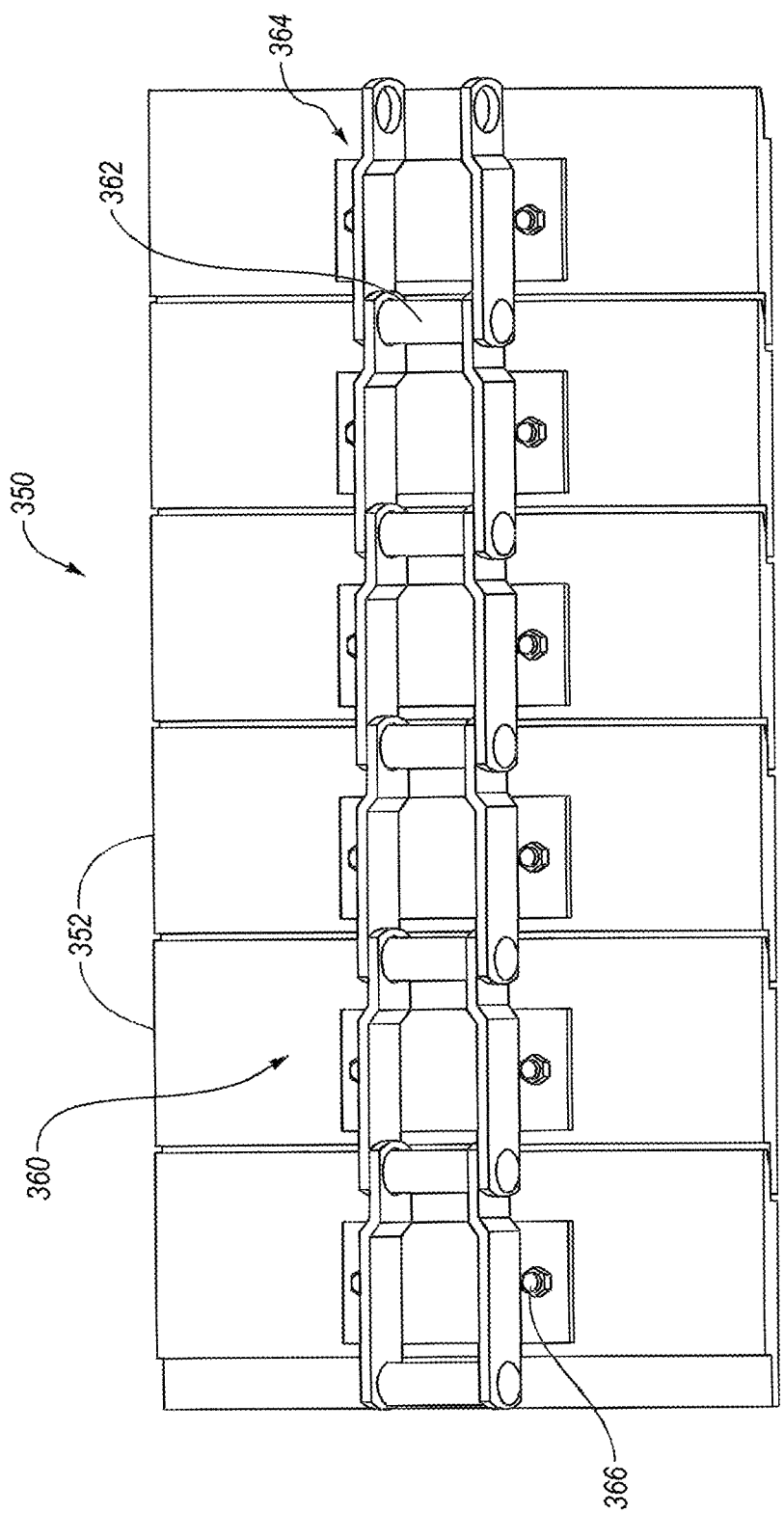
FIG. 8c is a detail view of an example chain with grousers attached.
Figure 8D:
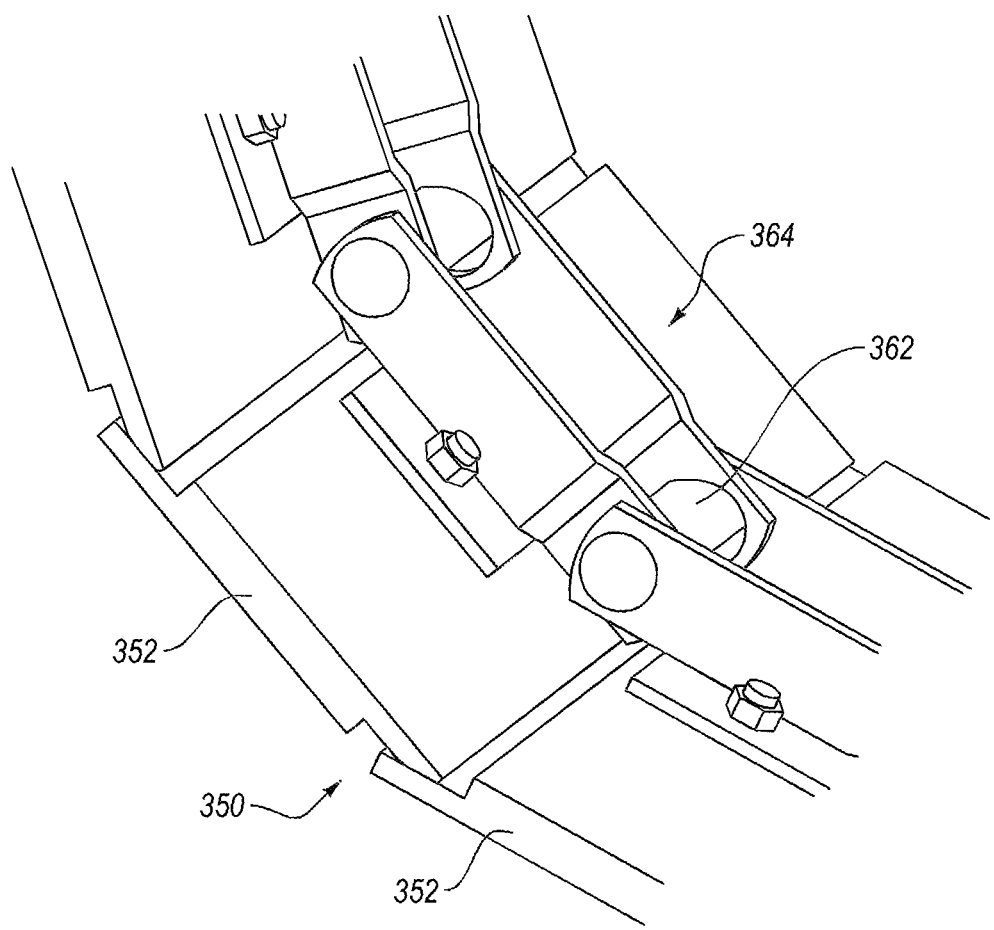
FIG. 8d is a detail view showing an interface between two example grousers.

Turning now to FIGS. 8b-8d, details are provided concerning a particular example of a grouser and chain configuration that can be used in at least some embodiments. In the example of FIGS. 8b-8d, the track is denoted generally at 350 and includes a chain 360 that engages a drive gear in the form of a sprocket 370. Example aspects of a sprocket, such as sprocket 370, are disclosed elsewhere herein. In general however, the sprocket 370 may include a plurality of teeth 372 where successive teeth are separated by spaces 374 that successively engage corresponding pins 362 of the chain 360. The pins 362 also secure successive links 364 of the chain 360 to each other. In the example of FIGS. 8b-8d, the links 364 are metal, although that is not required. In other embodiments, the links 364 can be plastic and connected to each other with pins, which may be metal.

As best shown in FIG. 8b, each of the links 364 may define one or more holes 364a which can accommodate a respective fastener 366, such as a bolt, screw or rivet for example, for releasably fastening a grouser 352 to the link 364. As indicated in FIG. 8d, the configuration and arrangement of the grousers 352 and links 364 is such that adjacent grousers 352 can change their angular position relative to each other.

In at least one example embodiment, the links 364 and grousers 352 may both be plastic. In yet another example embodiment, the links 364 and grousers 352 can be integrally formed with each other. That is, a link 364 and associated grouser 352 may take the form of a single piece of material, such as plastic, for example, and the links 364 joined to each other with metal or plastic pins.

F. Operational Aspects of Some Example Embodiments

In general, the operation of a CTTS is similar to tires in that the CTTS is able to transport an irrigation system through a field. However, and with attention finally to FIG. 9, it can be seen that the CTTS may resolve a number of problems typically associated with the use of tires in irrigation systems such as pivot irrigation systems.

Figure 9:
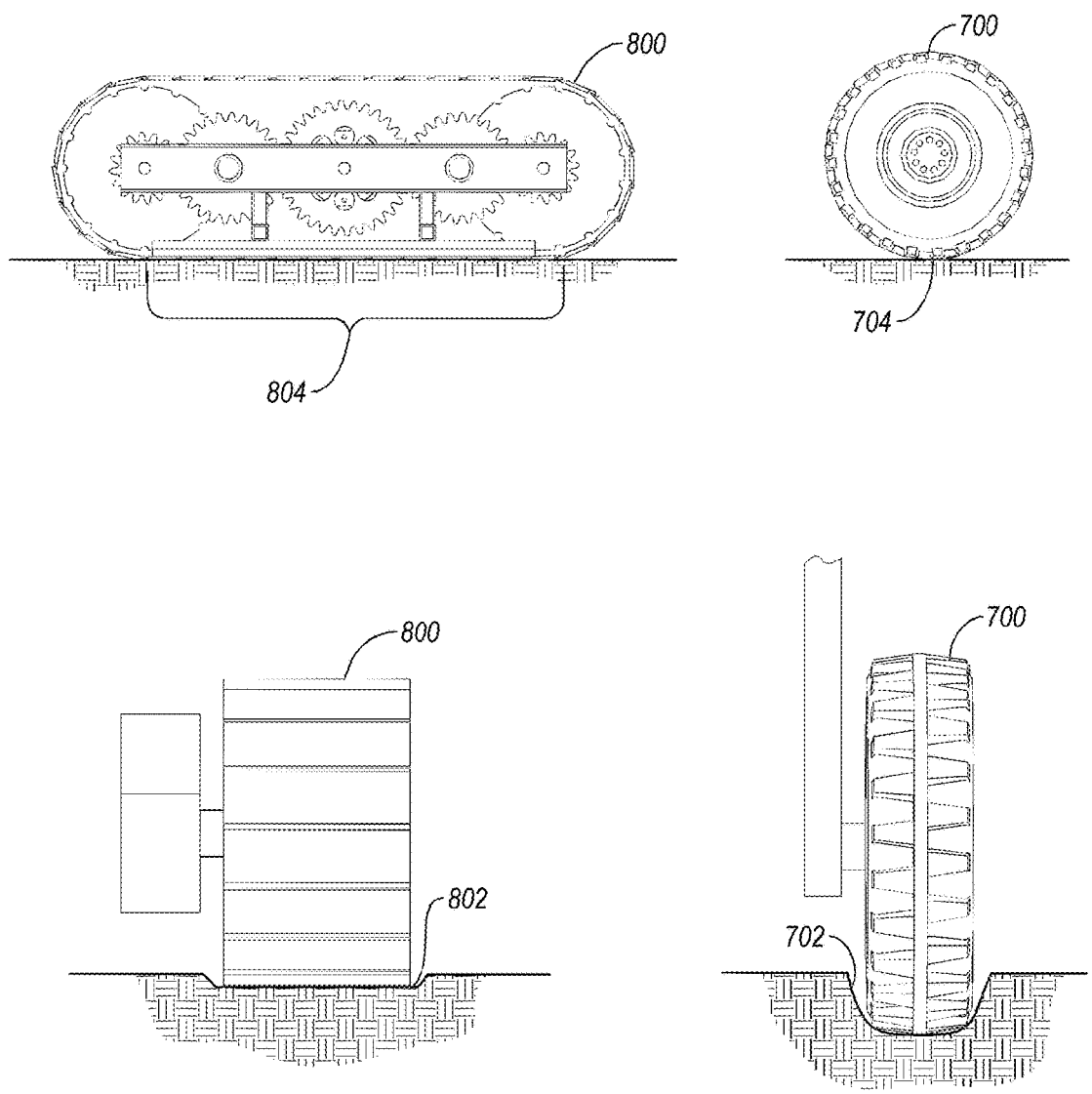
FIG. 9 discloses a track created by a continuous track transport system.

In particular, and as indicated in FIG. 9, it can be seen that a conventional tire 700 of an irrigation system creates a relatively wide and deep track 702 profile in the soil. The creation of such tracks 702 is problematic for reasons stated elsewhere herein. Moreover, the pressure exerted by the tire(s) 700 on the soil is relatively large because the contact area 704 between the tire 700 and soil is relatively small.

In contrast, a continuous track 800, such as may be used in embodiments of a CTTS, creates a relatively wide, but shallow, track 802 in the soil. For at least the reasons explained elsewhere herein, the track 802 is significantly less problematic than the track 702. This track 802 profile is at least partly a result of the fact that the pressure exerted on the soil by the continuous track 800 is relatively low, at least in comparison with the tire 700 which is typically employed on many irrigation systems. The low pressure is, in turn, a function of the relatively large contact area 804 between the continuous track 800 and the soil.

G. Operational Aspects of Some Example Embodiments

With reference to FIGS. 4-7 and 9, example embodiments of the CTTS operate generally as described hereafter. In particular, an input torque applied to a drive gear, such as drive gear 306, by a prime mover, such as prime mover 400, causes operation of a gear train, such as gear train 304. Operation of the gear train causes the rotation of a pair of drive wheels, such as drive wheels 320, which in turn, causes the rotation of a continuous track, such as continuous track 302, that is connected to the drive wheels. The motion of the continuous track causes the movement of an associated portion of an irrigation system through a field. As the irrigation system moves through the field, a track profile, such as the track 802, may be created. In some instances, the soil and field conditions may be such that a very small, or no, track is created by the CTTS.

H. Useful Aspects of Some Example Embodiments

As will be apparent from the disclosure, one or more embodiments of the CTTS can provide one or more advantageous and unexpected effects, in any combination, some examples of which are set forth below. It should be noted that such effects enumerated herein are neither intended, nor should be construed, to limit the scope of the claimed invention in any way.

One useful aspect of some embodiments of the invention is that such embodiments do not create the wide and deep tracks that commonly result from the use of tires or wheels on movable irrigation systems. Consequently, the soil erosion and related problems typically associated with the use of such tires or wheels may be reduced, or avoided, by use of a CTTS.

Another useful aspect of some embodiments of the invention is that the maintenance and cost burdens associated with the use of tires and wheels may be reduced, or eliminated by the employment of a CTTS.

I. Aspects of Further Example Embodiments

Figure 10:
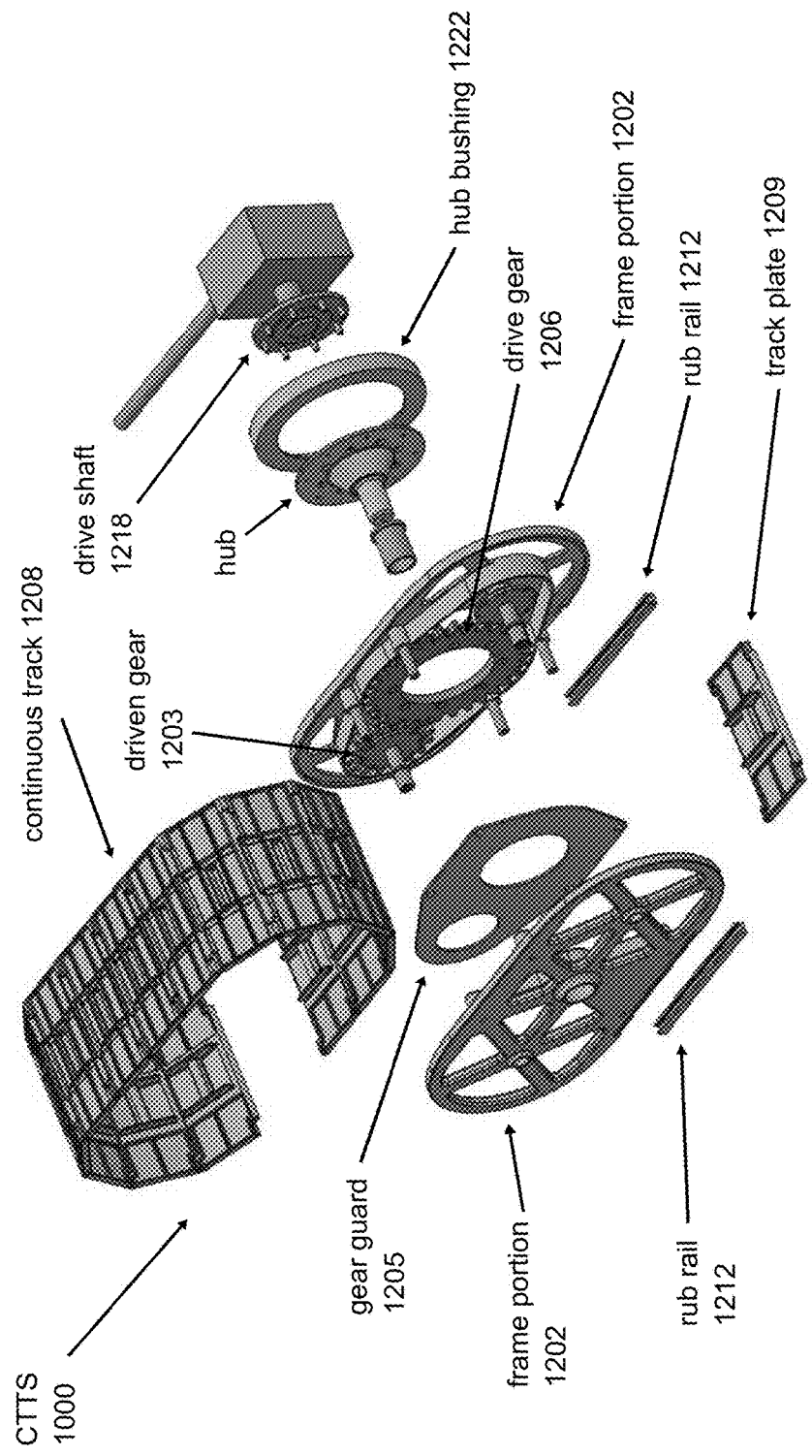
FIG. 10 is an exploded view of another example continuous track transport system (CTTS)
Figure 11:
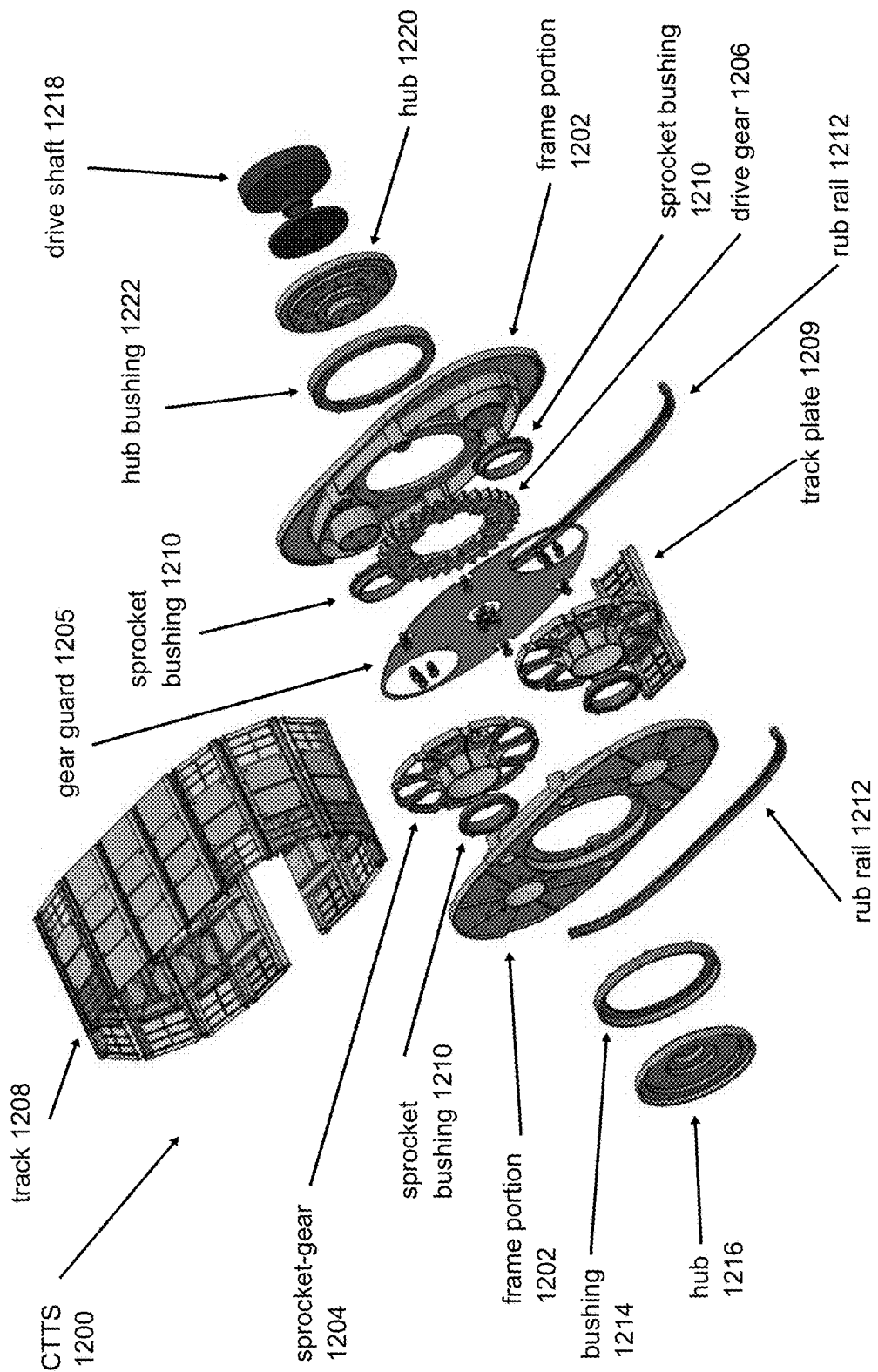
FIG. 11 is an exploded view of another example continuous track transport system (CTTS)
Figure 12:
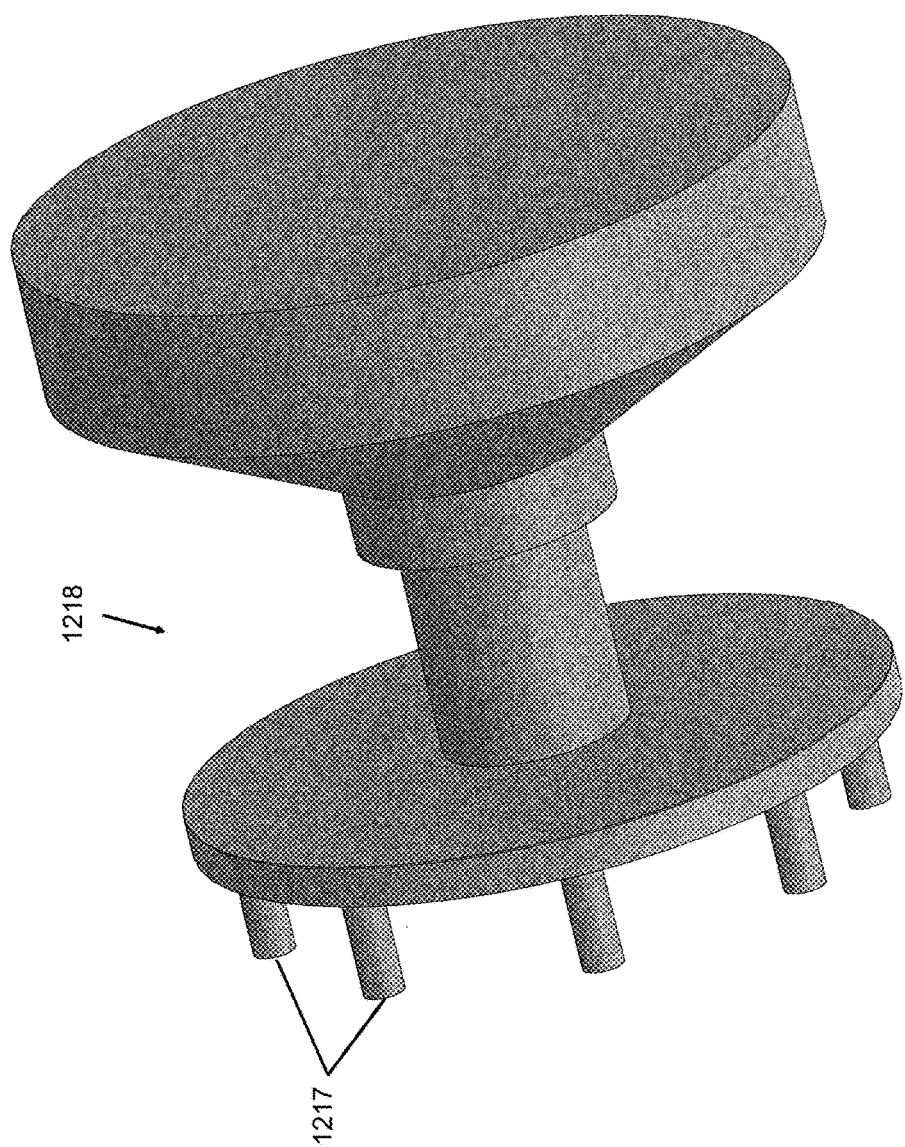
FIGS. 12-13 are directed to an example drive shaft of a CTTS.
Figure 13:
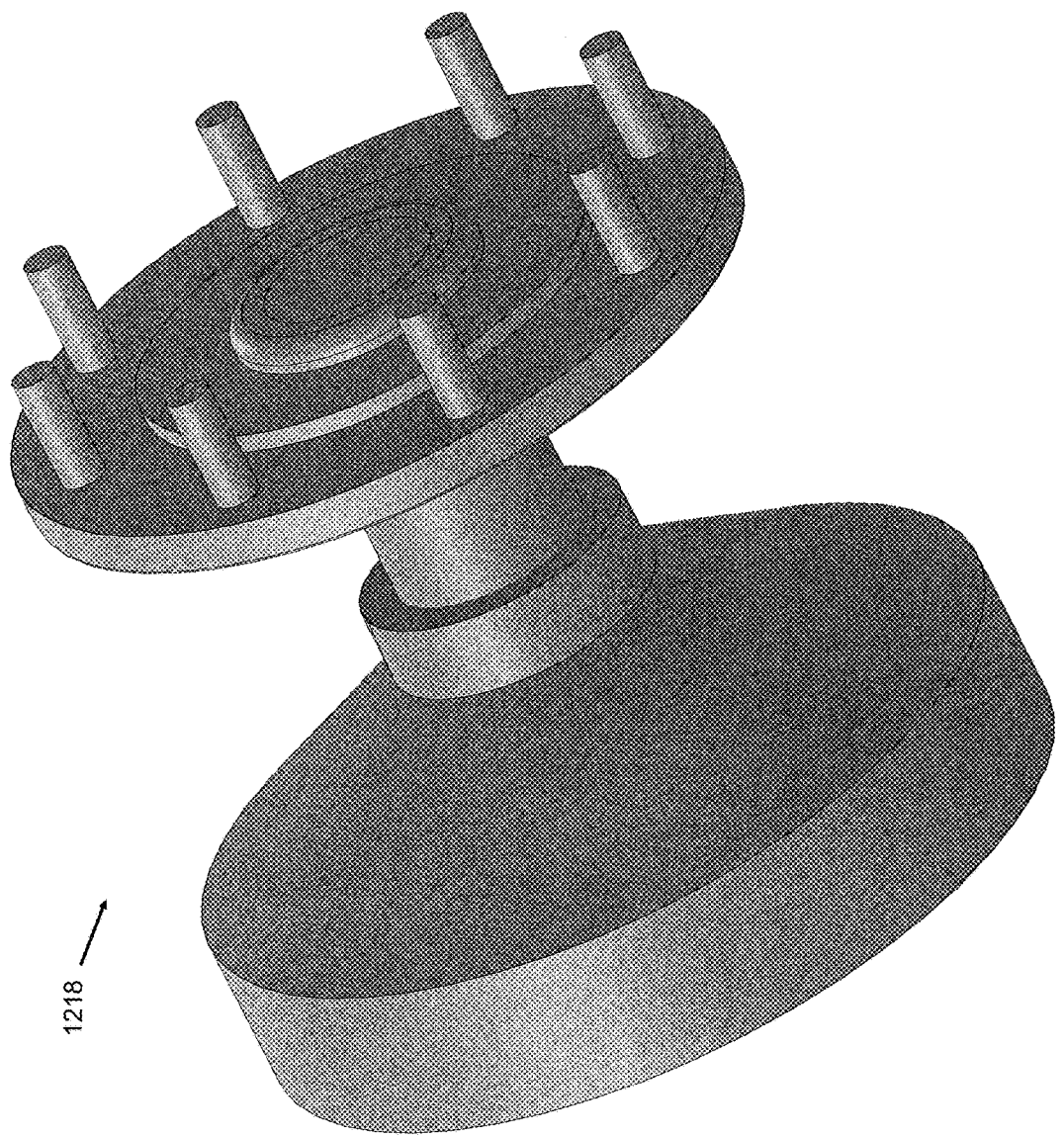
Figure 14:
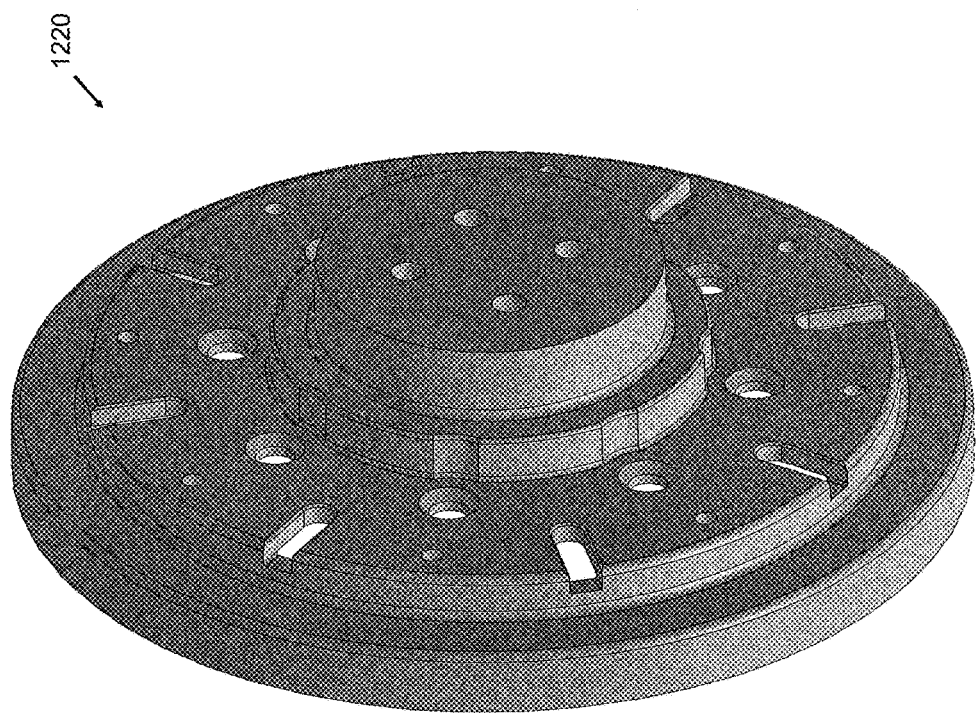
FIGS. 14-15 are directed to an example hub connectible to a drive shaft of a CTTS.
Figure 15:
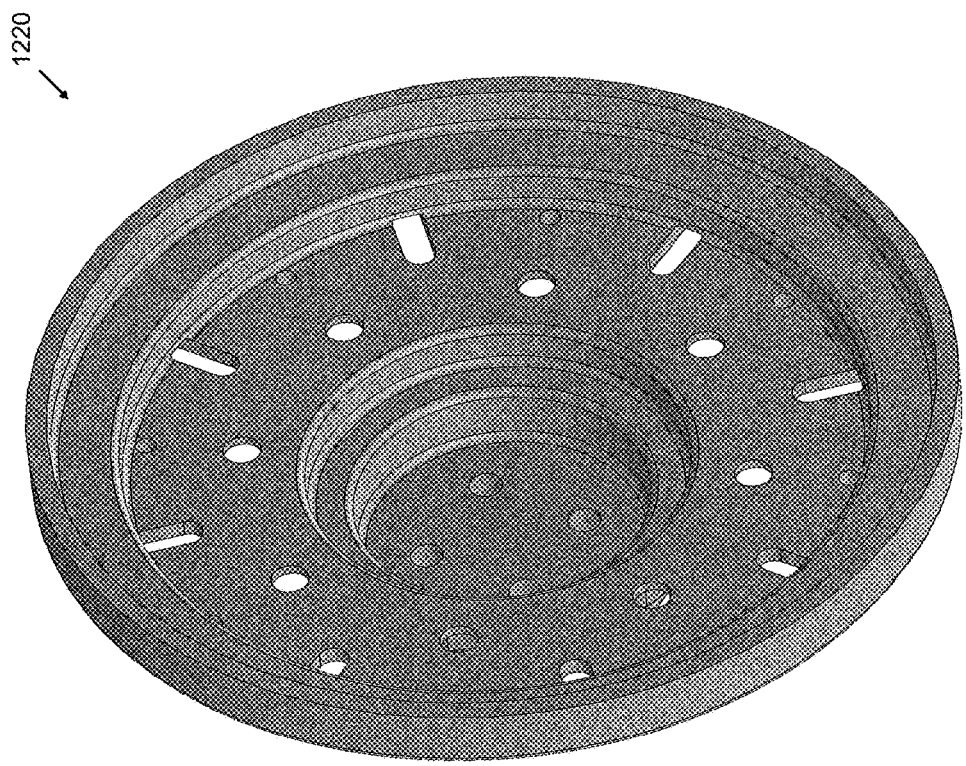
Figure 16:
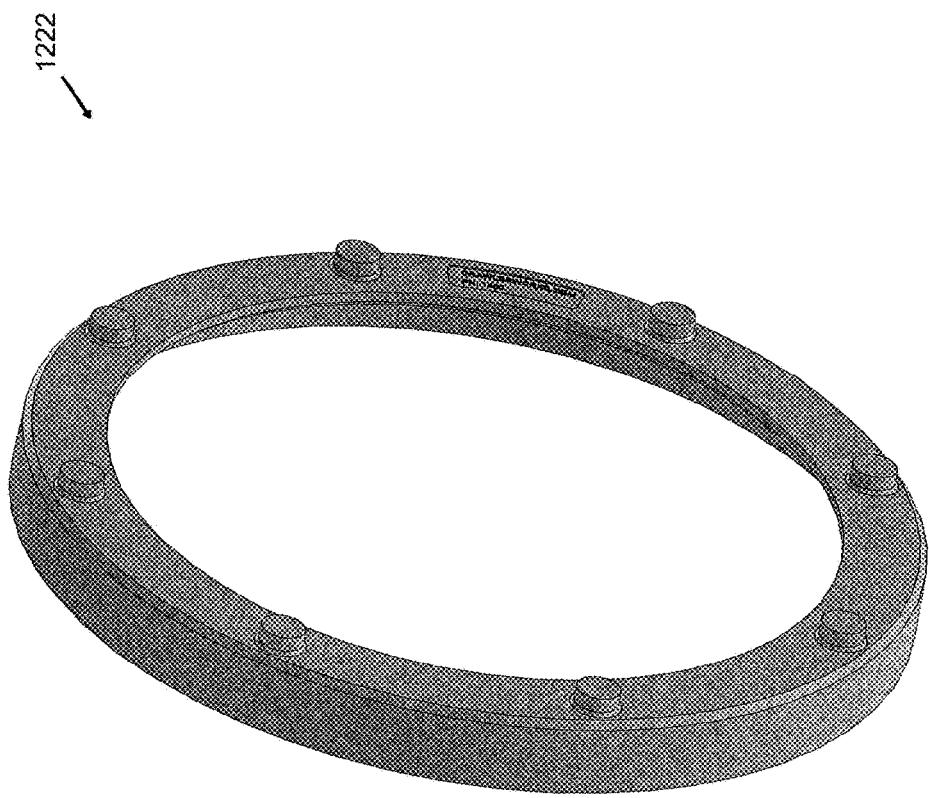
FIGS. 16-17 are directed to an example hub bushing usable with the hub of FIGS. 14-15.
Figure 17:
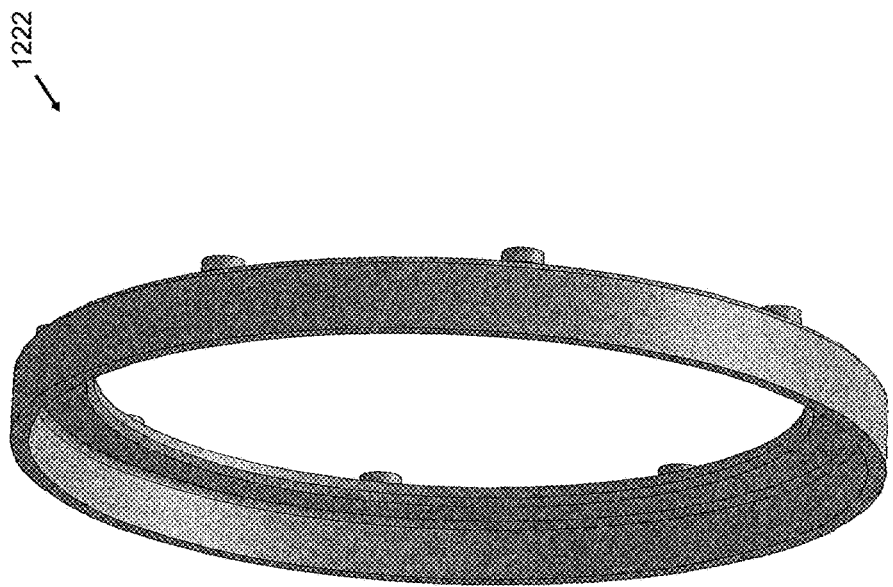
Figure 18:
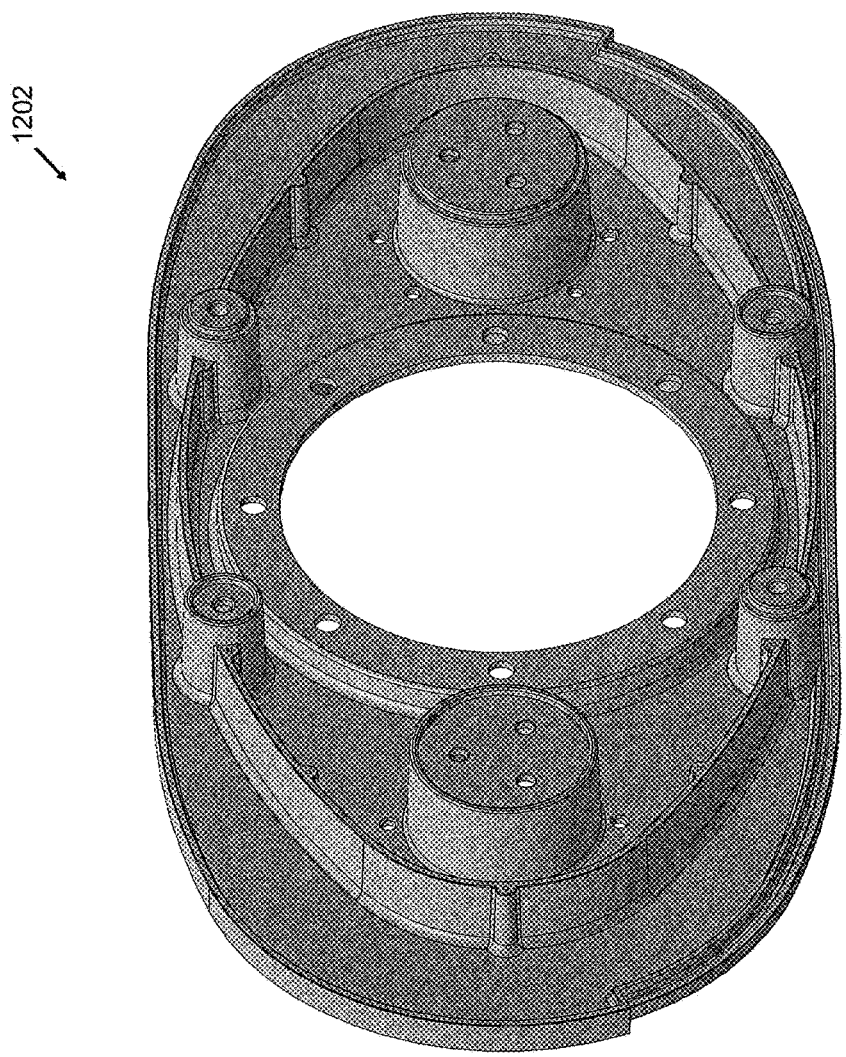
FIGS. 18-19 are directed to an example frame portion of a CTTS.
Figure 19:
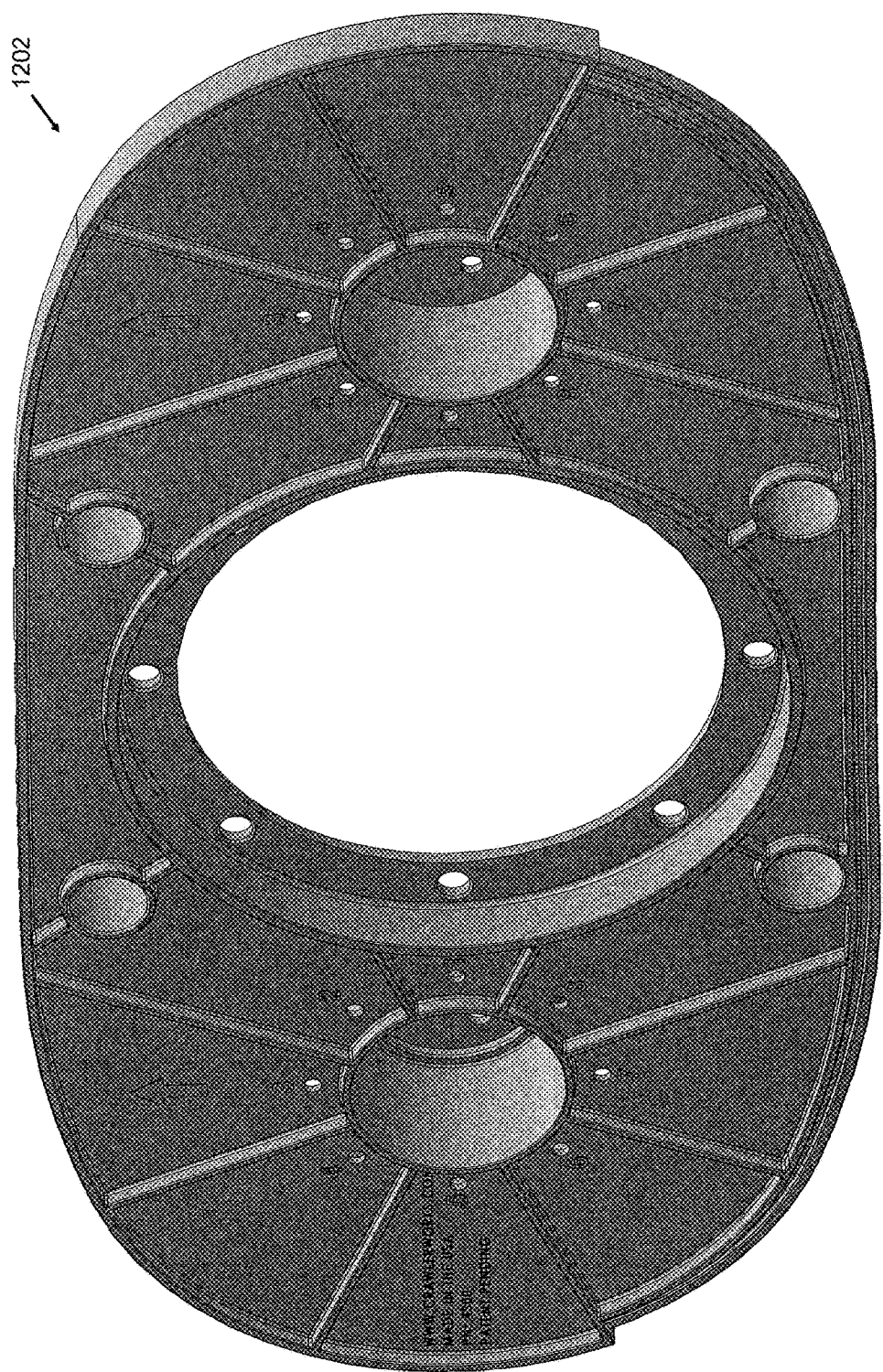
Figure 20:
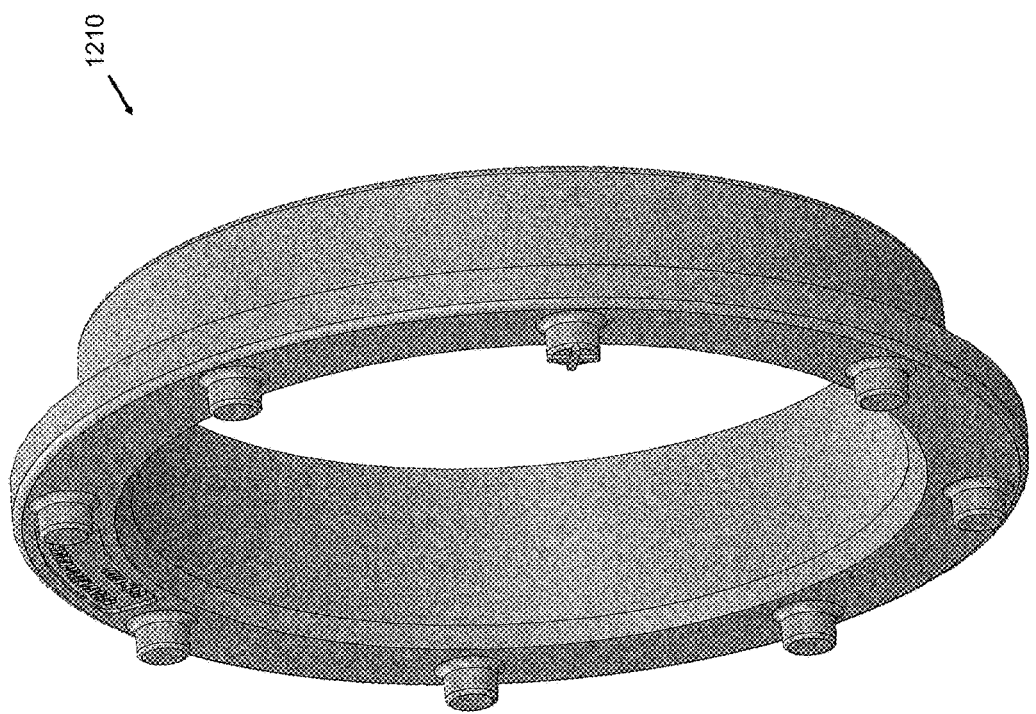
FIGS. 20-21 are directed to an example sprocket bushing of a CTTS.
Figure 21:
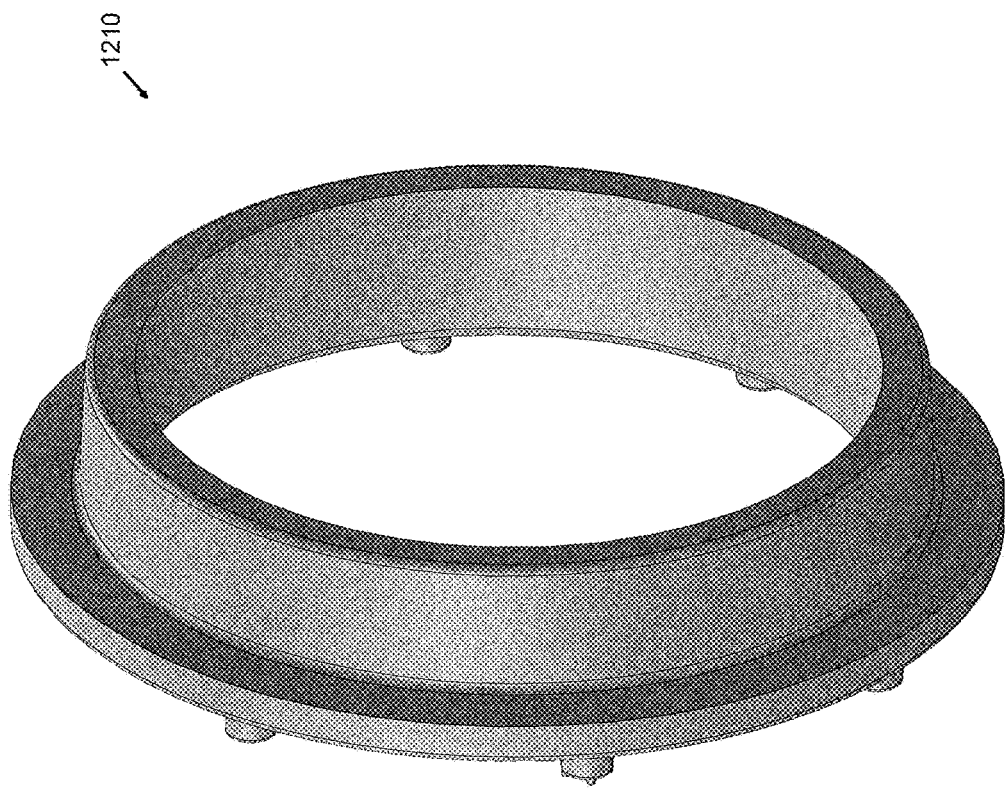
Figure 22:
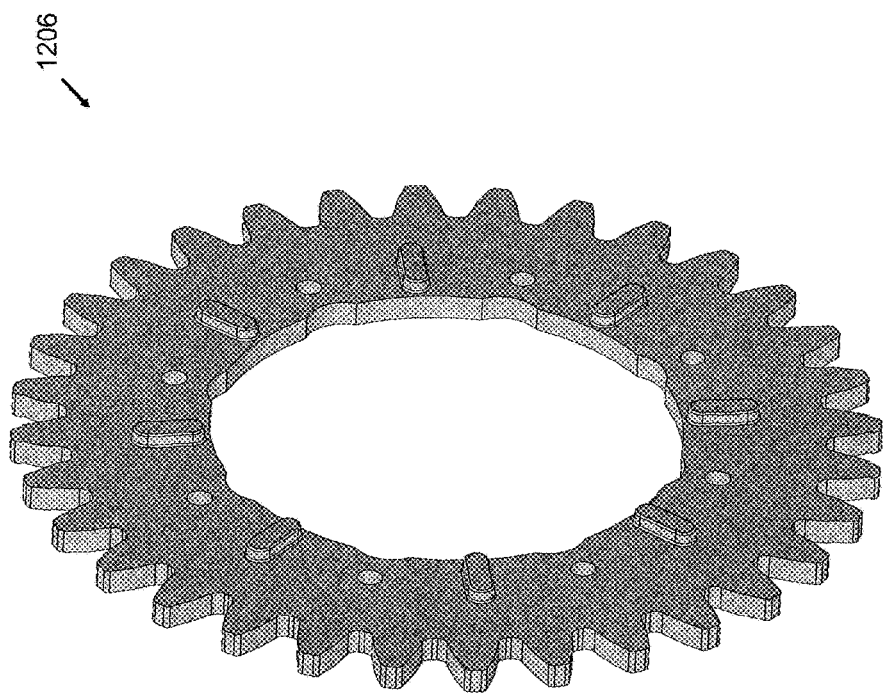
FIGS. 22-23 are directed to an example drive gear of a CTTS.
Figure 23:
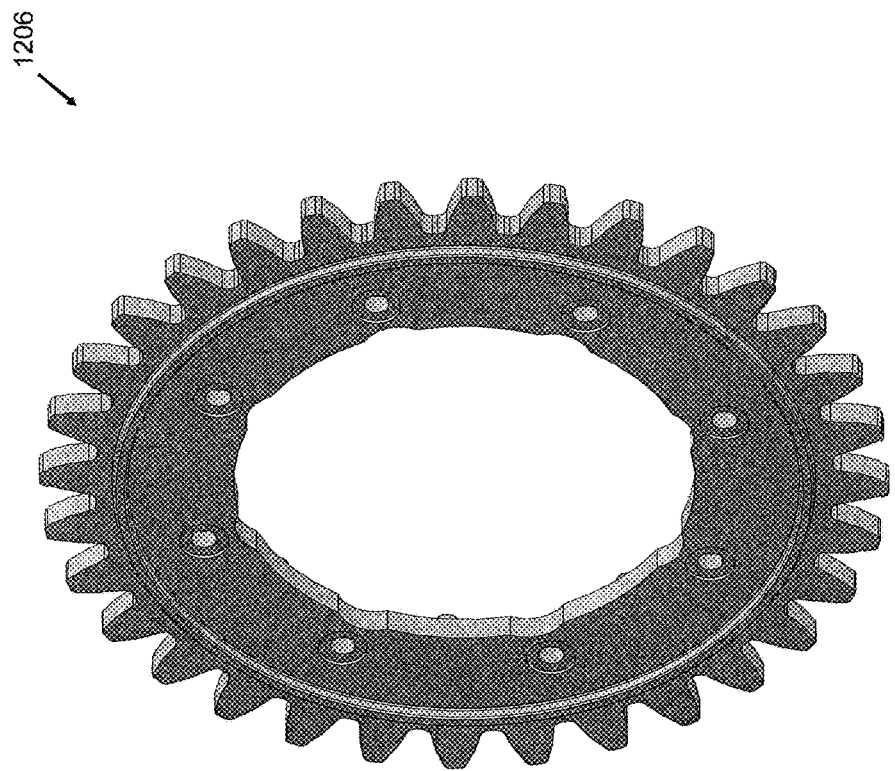
Figure 24:
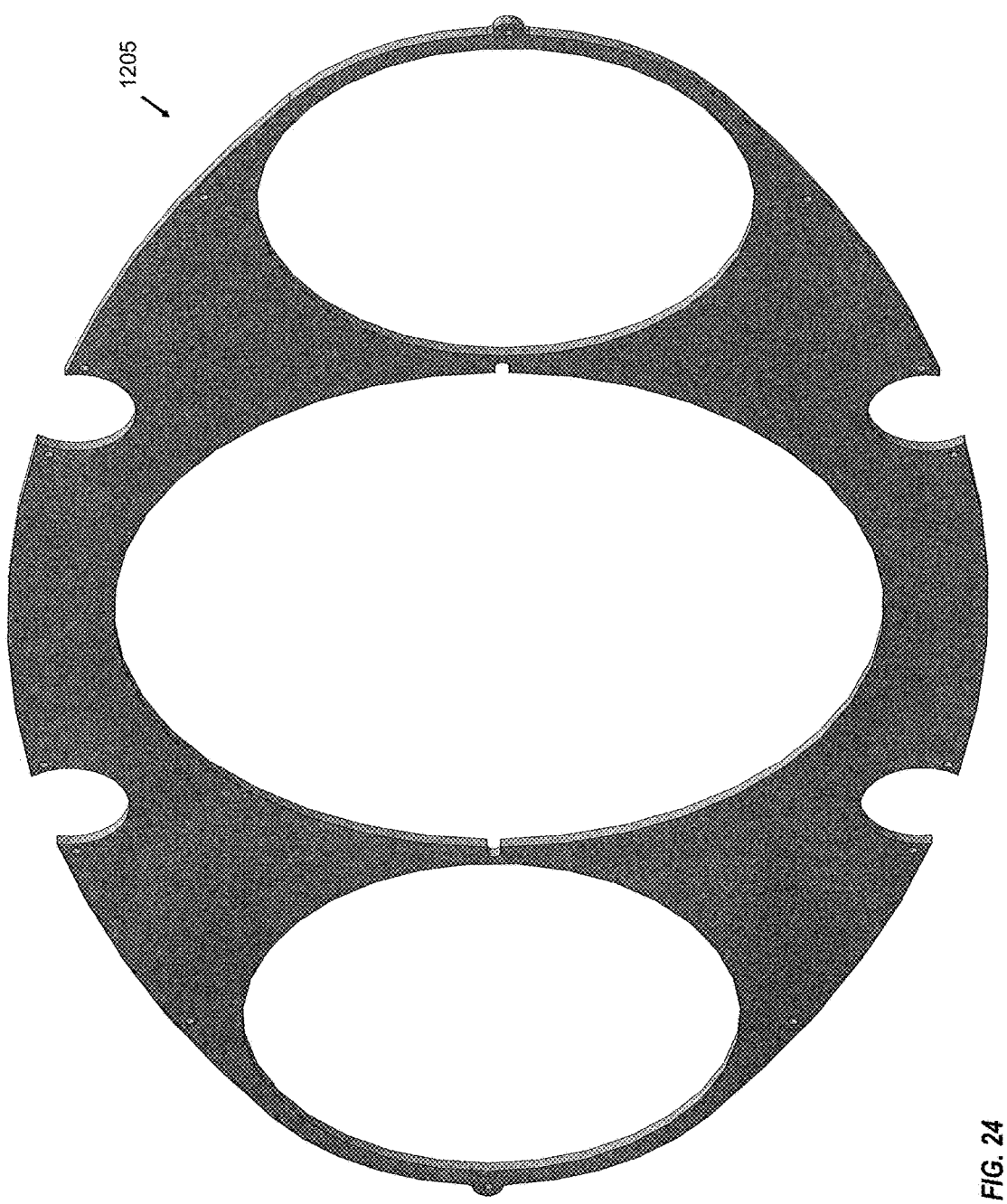
FIGS. 24-25 are directed to a gear guard of a CTTS.
Figure 25:
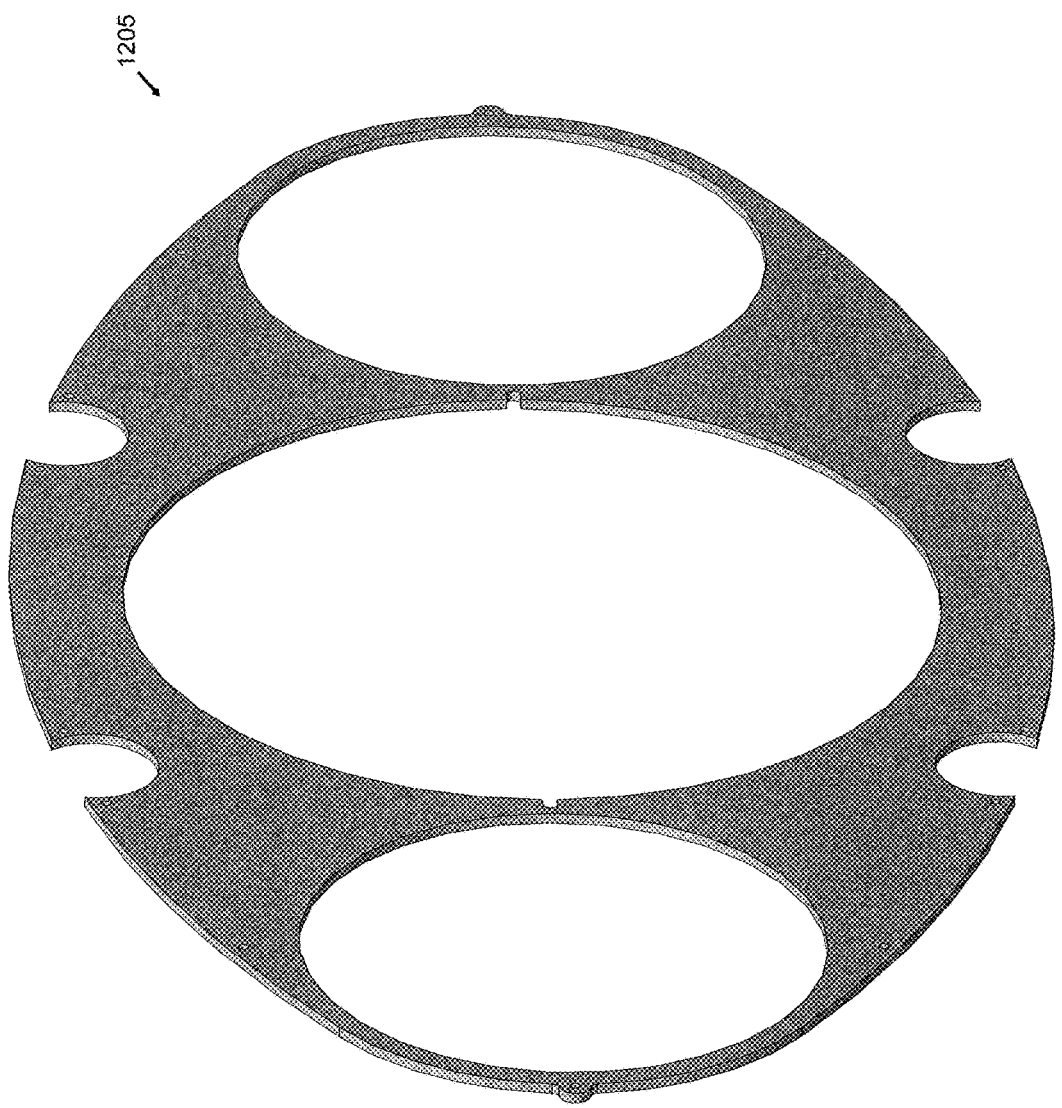
Figure 26:
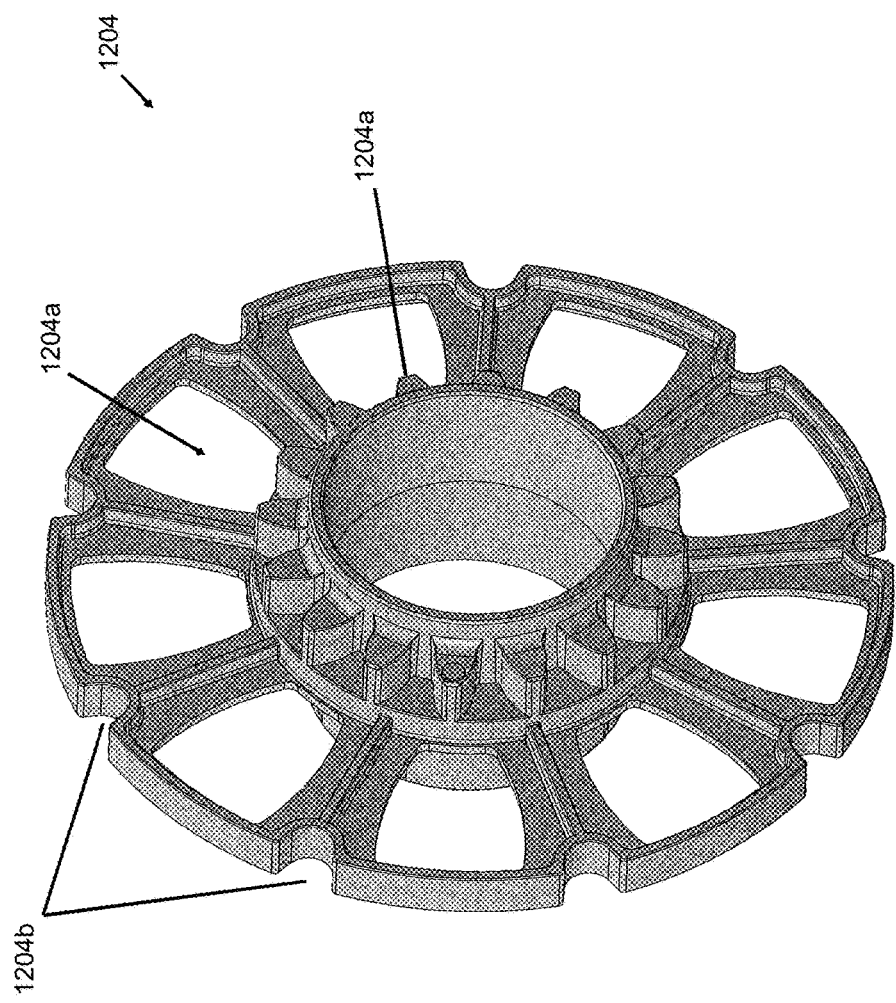
FIGS. 26-27 are directed to an example sprocket-gear combination of a CTTS.
Figure 27:
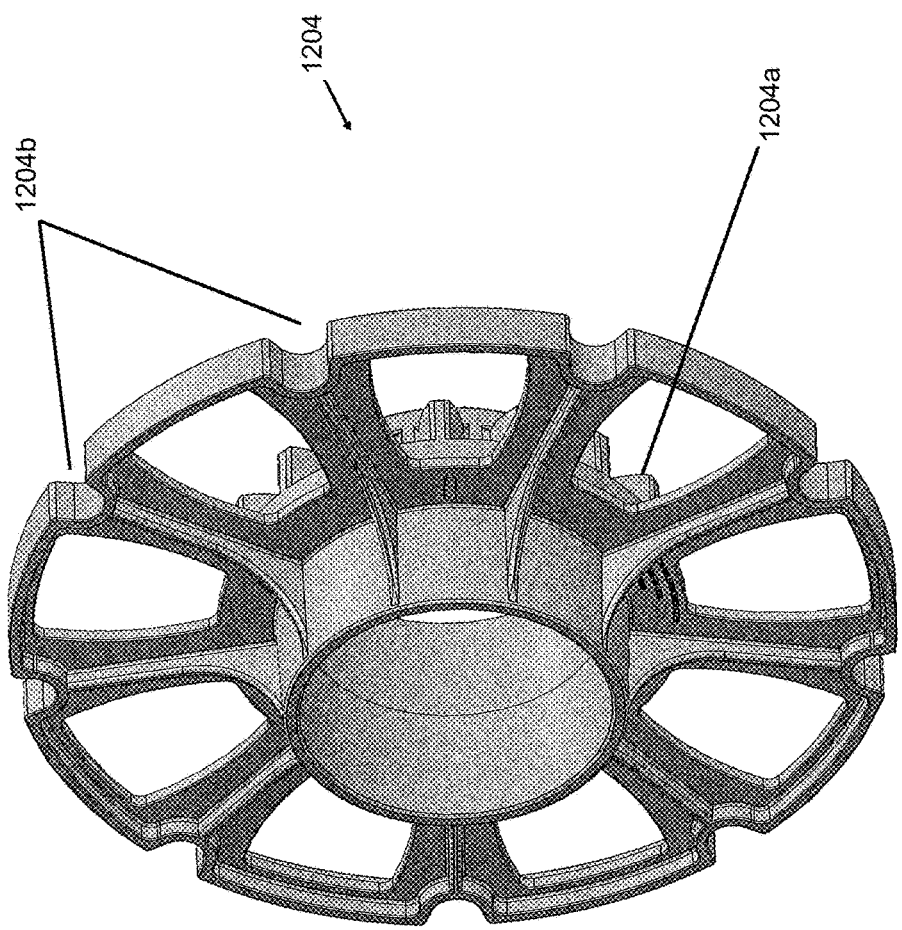
Figure 28:
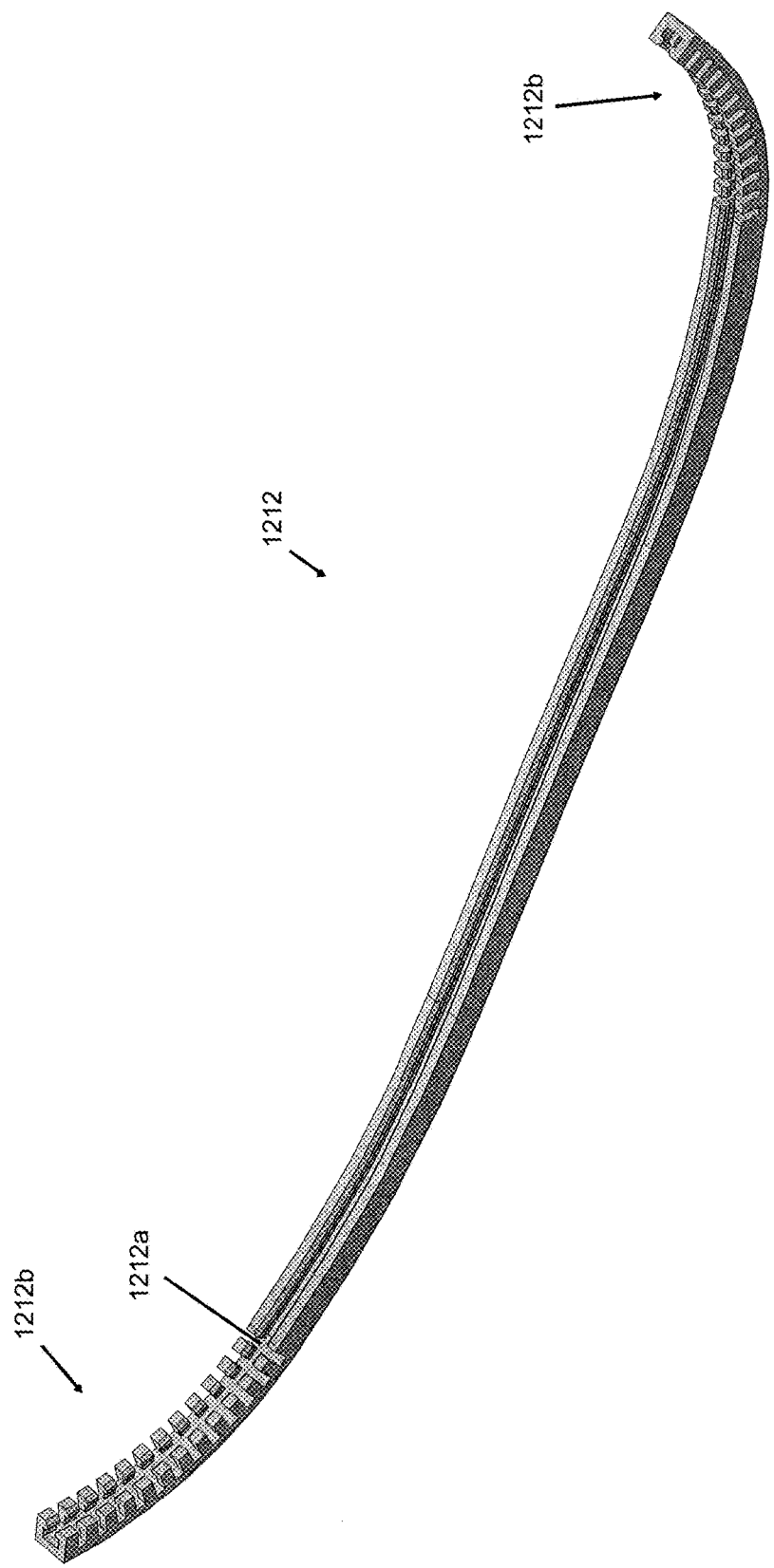
FIGS. 28-29 are directed to an example rub rail of a CTTS.
Figure 29:
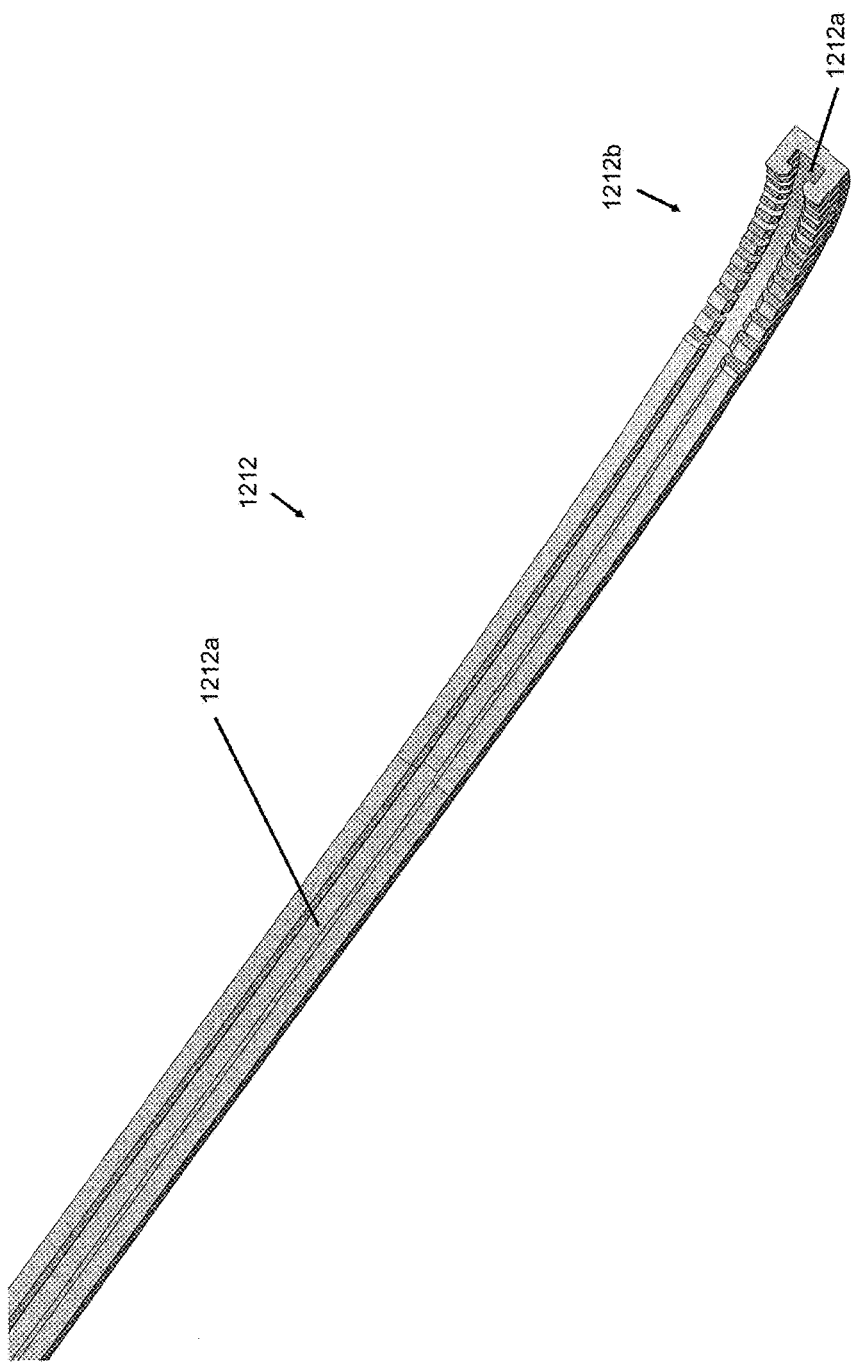
Figure 30:
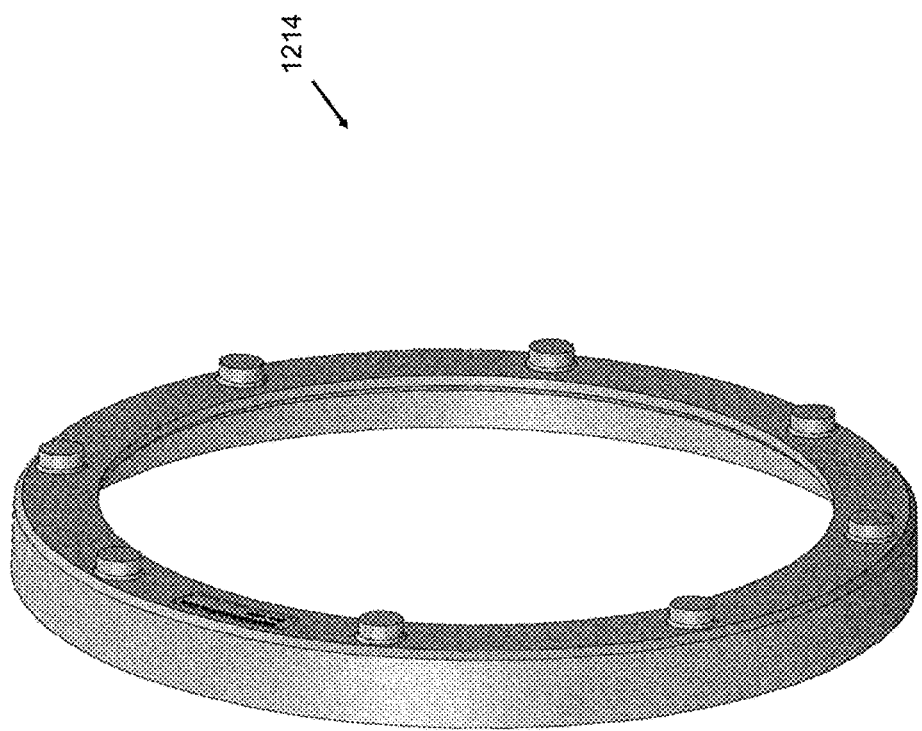
FIGS. 30-31 are directed to an example bushing.
Figure 31:
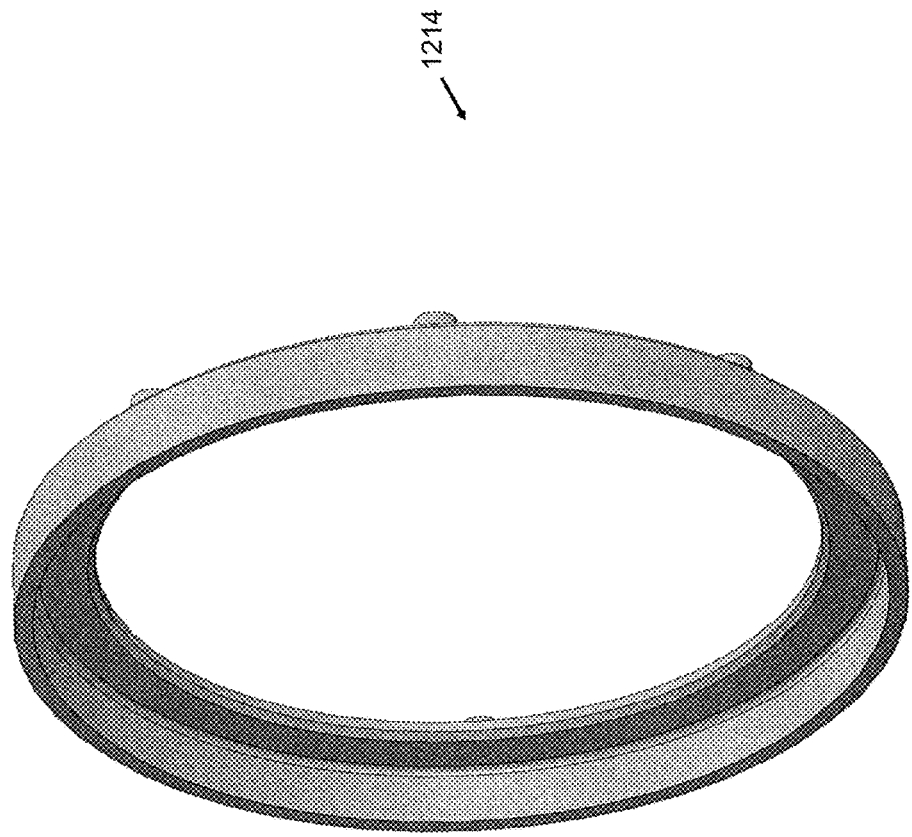
Figure 32:
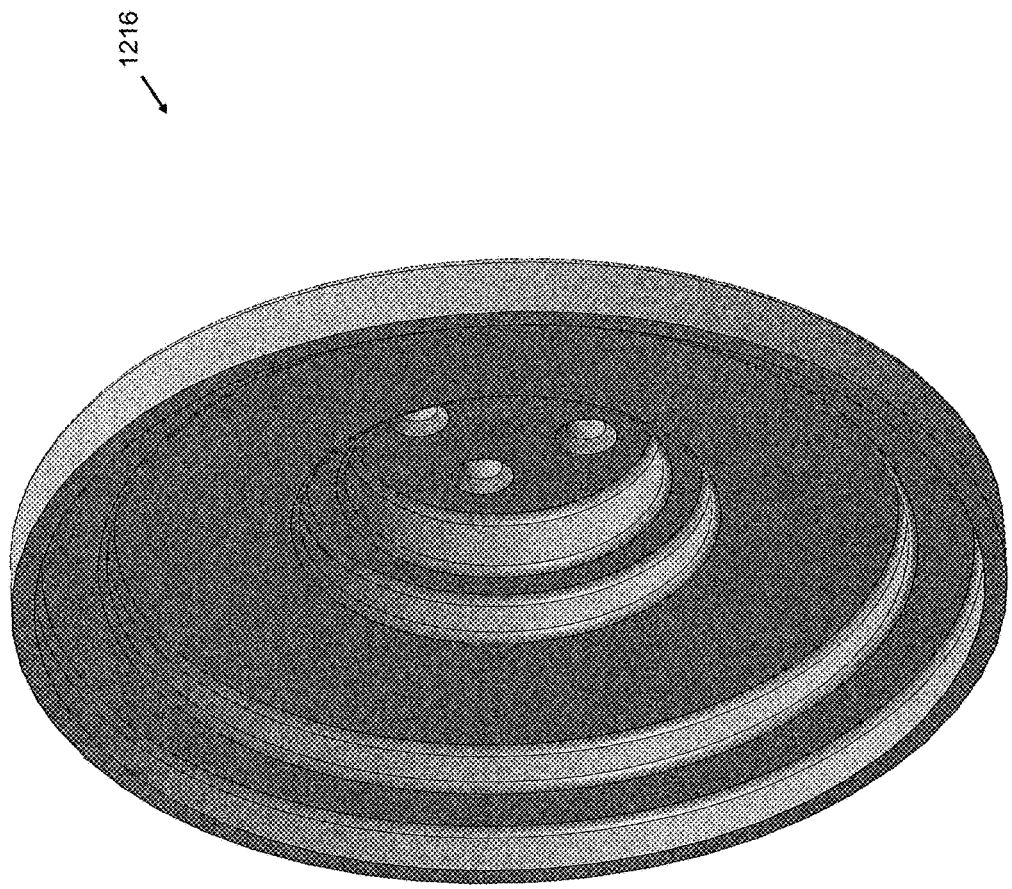
FIGS. 32-33 are directed to an example hub connectible to the bushing of FIGS. 30-31.
Figure 33:
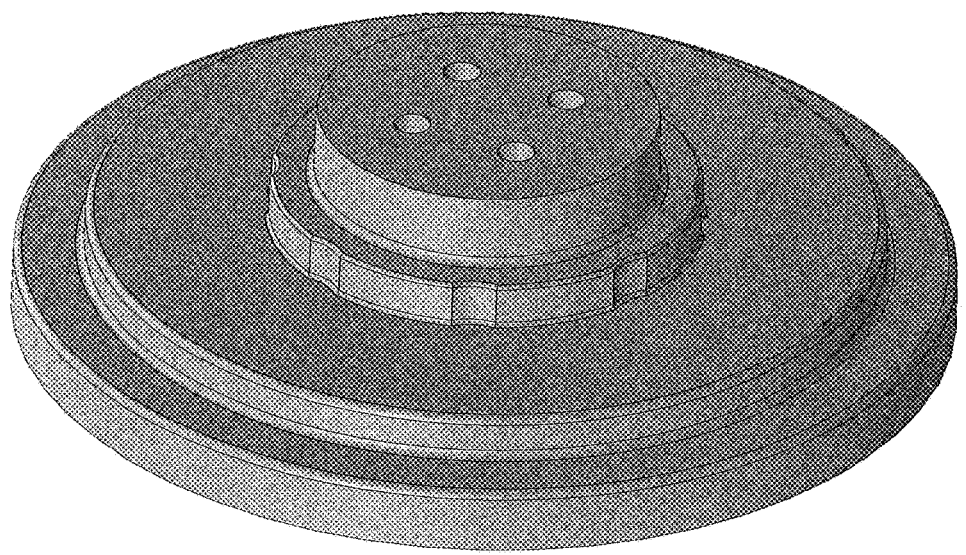
Figure 34:
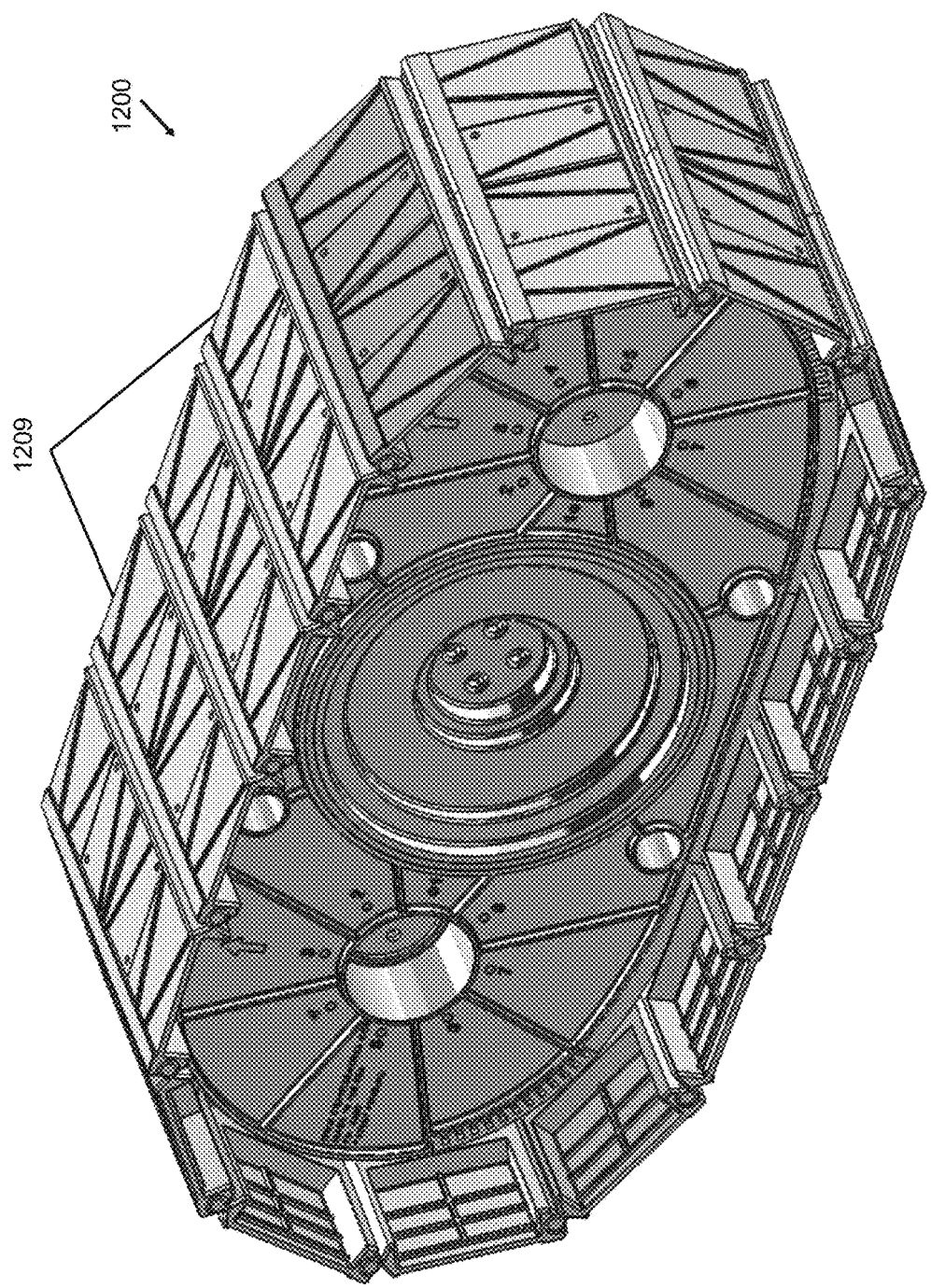
FIG. 34 is a perspective view of an example CTTS.

With reference next to FIGS. 10 and 11, two further embodiments 1000 and 1200, respectively, of a CTTS are disclosed. It should be noted that, with regard to any embodiment disclosed herein, reference to a 'unified, single-piece structure' or variations thereof, embraces molded structures, among other things, although none of the structures disclosed herein are required to be molded. Moreover, where a structure is molded, any suitable molding process or processes can be used, and the scope of the invention is not limited in that regard.

As well, it should also be noted that any of the components of the embodiments disclosed in FIGS. 11-40 may comprise, or consist of, glass-filled nylon. The glass-filled nylon components can be molded, or otherwise formed. Likewise, any of the components of the embodiments disclosed in FIGS. 1-10 may comprise, or consist of, glass-filled nylon. The glass-filled nylon components can be molded, or otherwise formed. Glass-filled nylon is one, non-limiting, example of a non-metallic material that can be used for any of the components disclosed herein.

As indicated in the particular example of FIG. 11, the CTTS can include two frame portions 1202 that cooperate to contain and support various other components. In at least some embodiments, the frame portions 1202 are made of glass-filled nylon, although other materials could alternatively be used. Further structural details of the frame portions are set forth in FIGS. 18 and 19. In general, operation of the CTTS 1000 and 1200 can be similar, or identical, to the CTTS embodiments disclosed in the '555 Application incorporated herein.

Within the frame portions 1202, a pair of sprocket-gears 1204 are provided that are configured to engage a drive gear 1206. In at least some embodiments, the sprocket-gears 1204 include a plurality of teeth 1204a and are made of glass-filled nylon, although other materials could alternatively be used. Further structural details of the sprocket-gears 1204 are set forth in FIGS. 26 and 27. In at least some instances, the sprocket-gear 1204 has a unified, single-piece structure. A gear guard 1205 helps to protect the sprocket-gears 1204 and drive gear 1206 from foreign matter. The gear guard 1205 can be made of metal, plastic, or other suitable material. Further structural details of the gear guard 1205 are disclosed in FIGS. 24 and 25.

With continued reference to the Figures, the sprocket-gears 1204 are configured to engage the track 1208, such as by way of the recesses 1204b, such that when driven by the drive gear 1206, the sprocket-gears 1204 impart motion to the track 1208 which includes a plurality of track plates 1209 connected to each other and which releasably engage the recesses 1204b. The drive gear 1206 can be made of a blend of acetal and PTFE, although other materials could alternatively be used. Further structural details of the drive gear 1206 are set forth in FIGS. 22 and 23. The track plates 1209 can be made of glass-filled nylon, although other materials could alternatively be used. Further structural details of the track plates 1209 are set forth in FIGS. 32-38. In at least some embodiments, each track plate 1209 takes the form of a unified single piece structure. The sprocket-gears 1204 are rotatably supported by sprocket bushings 1210, which can be made of acetal.

The CTTS 1200 further includes a pair of rub rails 1212 that can protect the frame portions 1202 from rubbing by the track 1208. The rub rails 1212 can be made of nylon, although other materials could alternatively be used. Further structural details of the rub rails 1212 are set forth in FIGS. 28 and 29. The rub rails 1212 may define an internal channel 1212a, and may also include one or more flexible portions 1212b. The flexible portions 1212b may be created through the use of a number of lateral cuts or other structures or features in the portion which is desired to be made flexible.

On the front of the CTTS 1200, a bushing 1214 and hub 1216 are provided that are able to connect with, and support, the drive gear 1206. The bushing 1214 can be made of steel or acetal, and the hub 1216 of ductile iron, and coated with zinc chromate. Other materials for the bushing 1214 and/or hub 1216 could alternatively be used. Further structural details of the bushing 1214 and hub 1216 are set forth in FIGS. 30-31, and FIGS. 32-33, respectively.

On the other side of the CTTS 1200, a drive shaft 1218 is provided that may be made of steel, or other suitable material(s). Further structural details of the drive shaft 1218 are set forth in FIGS. 12 and 13. The drive shaft 1218 is connectible by way of fasteners 1217 to a hub 1220 that is supported in the frame portion 1202 by a hub bushing 1222. Similar to the hub 1216, the hub 1220 can be made of ductile iron, and coated with zinc chromate, although other materials could alternatively be used for the hub 1220 material and/or coating. Further structural details of the hub 1220 are set forth in FIGS. 14 and 15. The hub bushing 1222 can be made of steel, or other suitable material(s). Further structural details of the hub 1220 are set forth in FIGS. 16 and 17.

With reference finally to FIGS. 34-40, various views of an example track plate 1209 are indicated. As best shown in FIGS. 34, 35, 36, 39 and 40, each of the track plates 1209 can include engagement structures 1209a and 1209b on respective sides of the track plate 1209. Thus, successive track plates 1209 can be joined together by sliding the engagement structure 1209b of a first track plate 1209 into the engagement structure 1209a of the adjacent track plate 1209. In this way, the track 1208 can have a continuous structure.

Figure 35:
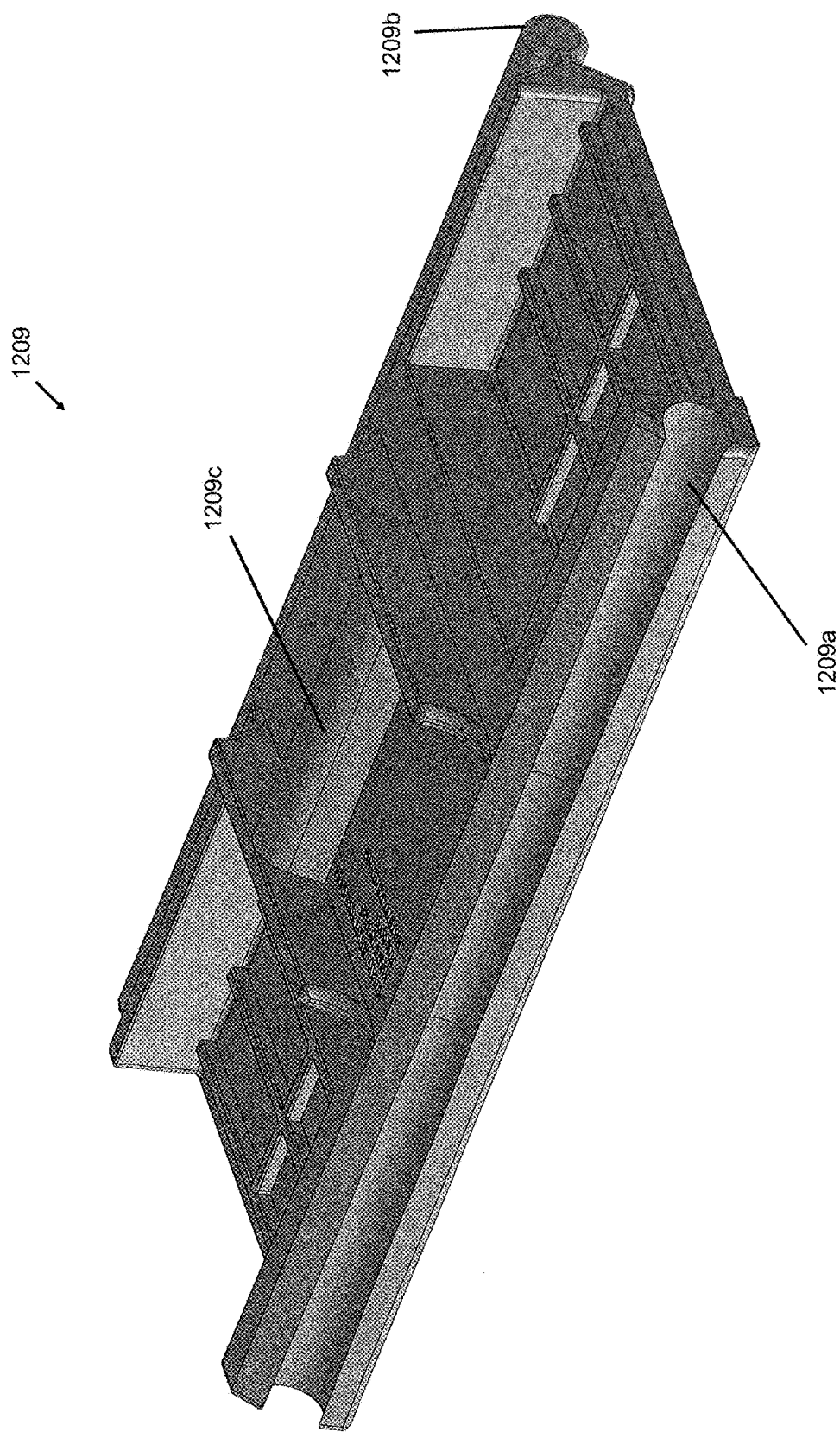
Figure 36:
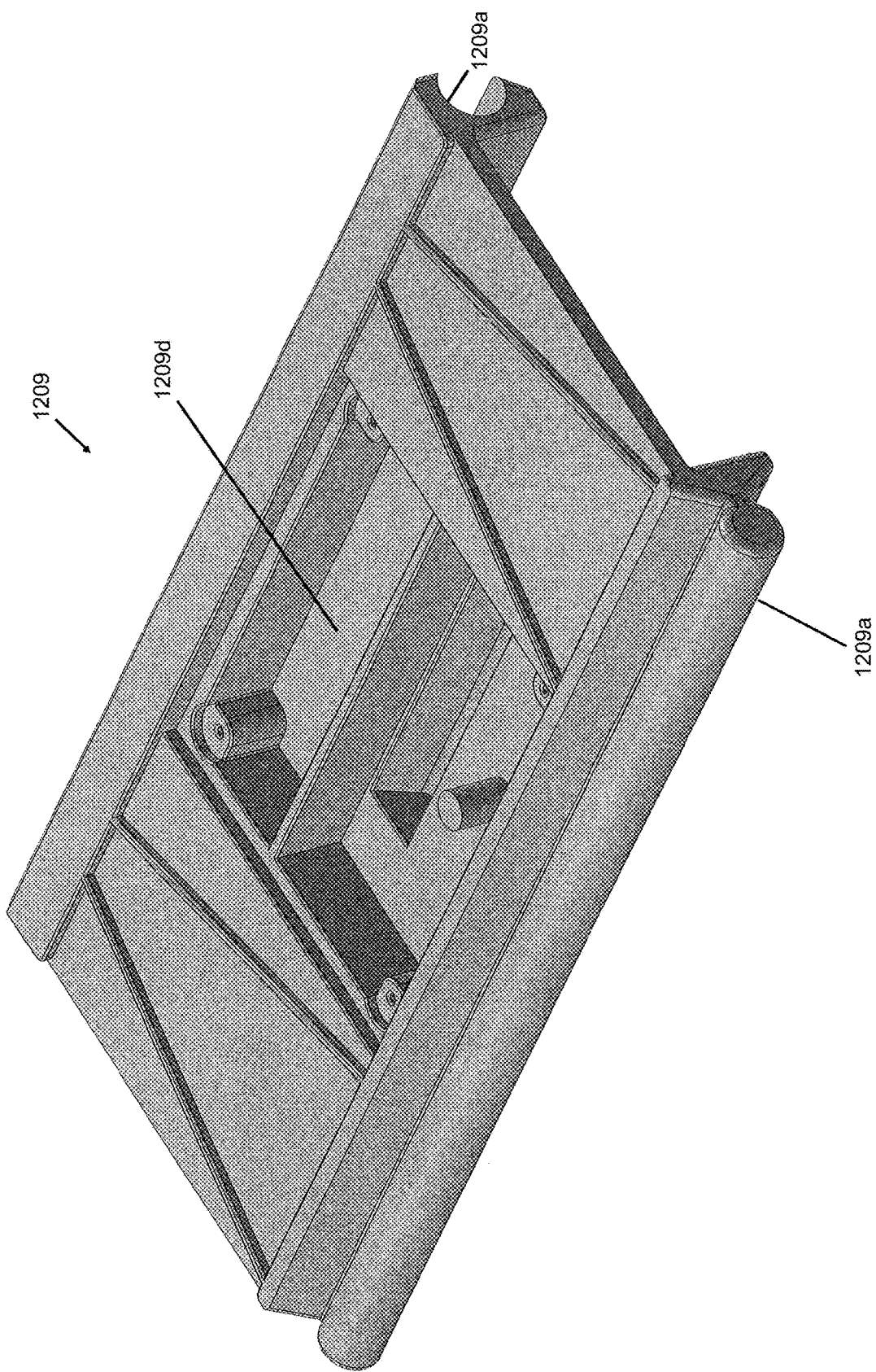
Figure 37:
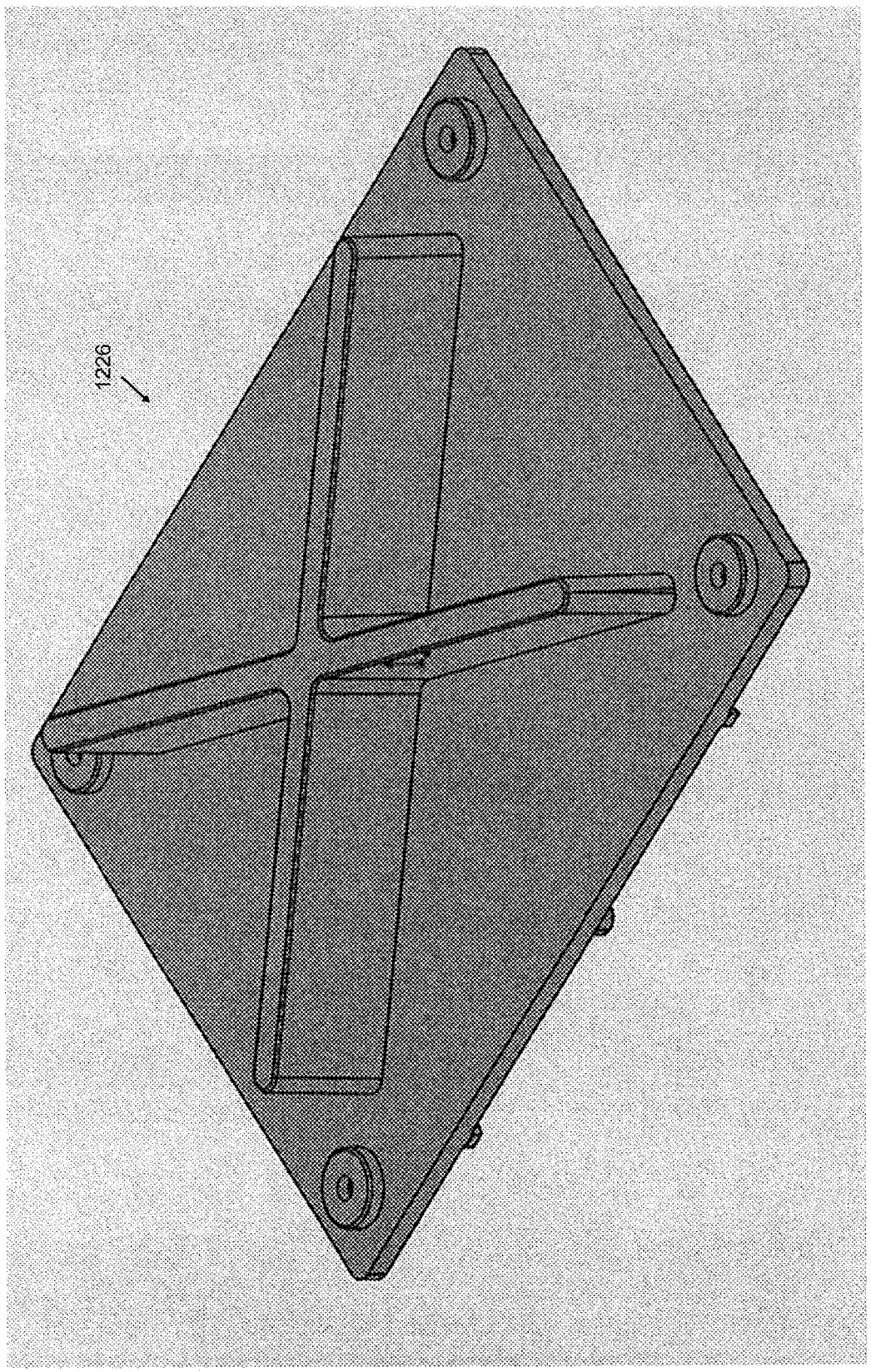
Figure 38:
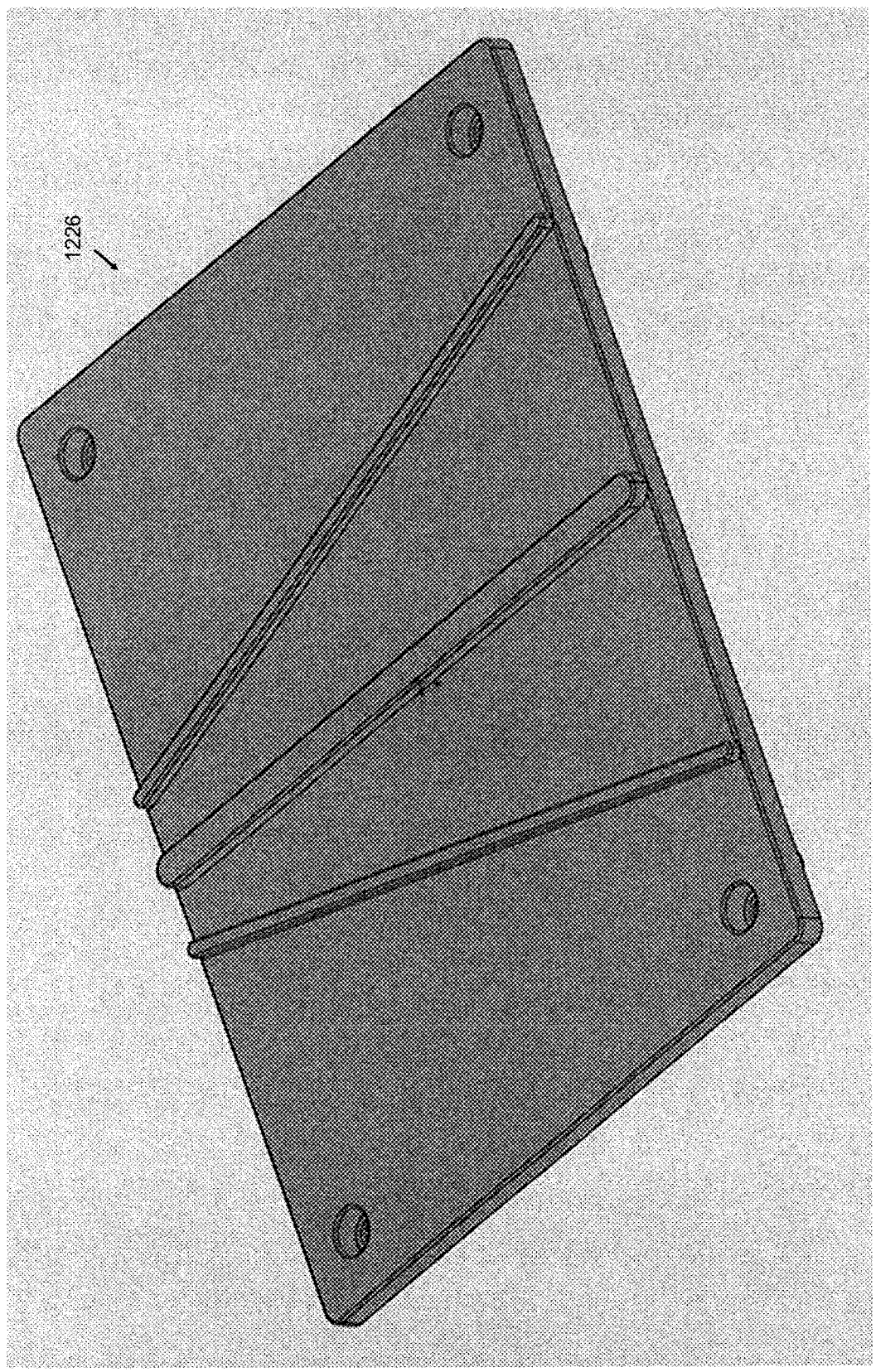

With particular reference to FIG. 35, the top side of each track plate 1209 can include a crossbar 1209c. The crossbar 1209c is configured and arranged to be removably received in a notch 1204b (see FIG. 26) of a sprocket-gear 1204. In this way, rotation of the sprocket-gears 1204 causes movement of the track 1208.

As indicated in FIGS. 37-40, each of the track plates 1209 can include a cover 1226. The track plates 1209 can define a recess 1209d to which the cover 1226 can be attached, such as by way of fasteners 1228. The cover 1226 is intended to be permanently installed. The recess 1209d is created as part of a molding process for the track plate 1209. Without the recess 1209d, the area of the track plate 1209 in the vicinity of the recess 1209d may be too thick and not inject, or cool, consistent with the rest of the track plate 1209. The cover 1226 covers the recess 1209d to keep the track plate 209 from carrying dirt and/or other foreign matter.

Although this disclosure has been described in terms of certain example embodiments, other embodiments apparent to those of ordinary skill in the art are also within the scope of this disclosure.

What is claimed is:

1. A continuous track transport system (CTTS) suitable for use in connection with an irrigation system, comprising:
   a continuous track that includes a plurality of track plates configured and arranged so that adjacent track plates are directly connected to each other;
   a gear train, comprising:
      a drive gear configured and arranged to receive a rotary input by way of an interface that is connectible to a portion of an irrigation system chassis; and
      first and second driven sprocket-gears engaged with the continuous track, each of the first and second driven sprocket-gears including a respective driven gear engaged with the drive gear to enable transfer of the rotary input from the drive gear to the first and second driven sprocket-gears;
   and
   a frame which rotatably supports one or more gears of the gear train.

2. The CTTS as recited in claim 1, wherein the track plates comprise glass-filled nylon.

3. The CTTS as recited in claim 1, wherein the drive gear comprises acetal and PTFE.

4. The CTTS as recited in claim 1, wherein the frame comprises glass-filled nylon.

5. The CTTS as recited in claim 1, further comprising a hub connected at least indirectly to the drive gear, the hub comprising either: plastic; or, ductile iron and having a zinc chromate coating on at least a portion of the hub.

6. The CTTS as recited in claim 1, further comprising a rub rail engaged with an edge of the frame, the rub rail comprising nylon.

7. The CTTS as recited in claim 1, wherein the plurality of track plates includes first and second adjacent track plates comprising respective first and second complementary structures that are rotatably engaged with each other.

8. The CTTS as recited in claim 1, wherein the driven gears of the first and second driven sprocket-gears are integral with the first and second driven sprocket-gears, respectively.

9. The CTTS as recited in claim 1, wherein the drive gear and/or the first and second driven sprocket-gears comprise glass-filled nylon.

10. A continuous track transport system (CTTS) suitable for use in connection with an irrigation system, comprising:
   a continuous track that includes a plurality of track plates configured and arranged so that adjacent plates are directly rotatably connected to each other, and the track plates each comprise glass-filled nylon;
   a gear train operable to transmit an input torque to the continuous track to effect movement of the continuous track, the gear train including:
      a drive gear configured and arranged to receive the input torque by way of an interface that is connectible to an irrigation system chassis;
      first and second driven sprocket-gears engaged with the continuous track, each of the first and second driven sprocket-gears including a respective driven gear engaged with the drive gear, and the first and second driven sprocket-gears each comprise glass-filled nylon; and
      a frame which rotatably supports one or more gears of the gear train.

11. The CTTS as recited in claim 10, further comprising a hub connected at least indirectly to the drive gear, the hub comprising either: plastic; or, ductile iron and having a zinc chromate coating on at least a portion of the hub.

12. The CTTS as recited in claim 10, wherein the drive gear comprises acetal and PTFE.

13. The CTTS as recited in claim 10, wherein one or both of the first and second driven sprocket-gears is in the form of a unified, single piece structure.

14. The CTTS as recited in claim 10, wherein the frame comprises first and second frame portions between which a portion of the gear train is disposed, and the first and second frame portions each comprise glass-filled nylon.

15. A continuous track transport system (CTTS) suitable for use in connection with an irrigation system, comprising:
   a continuous track that includes a plurality of track plates configured and arranged so that adjacent plates are directly connected to each other;
   a gear train operable to transmit an input torque to the continuous track to effect movement of the continuous track, the gear train including:
      a drive gear configured and arranged to receive the input torque by way of an interface that is connectible to an irrigation system chassis; and
      first and second driven sprocket-gears engaged with the continuous track, and each of the first and second driven sprocket-gears including a respective driven gear that is engaged with the drive gear, wherein the first and second driven sprocket-gears comprise glass-filled nylon and are each formed as a respective unified, single piece structure; and
   a frame which rotatably supports one or more gears of the gear train.

16. The CTTS as recited in claim 15, wherein the frame comprises first and second frame portions between which a portion of the gear train is disposed.

17. The CTTS as recited in claim 15, wherein the interface comprises a drive shaft, and the CTTS further comprises a hub that is connected to the drive shaft and supported in the frame by a hub bushing.

18. The CTTS as recited in claim 15, further comprising a hub 1216 connected to the drive gear and supported in the frame by a bushing.

19. The CTTS as recited in claim 15, wherein the drive gear comprises acetal and PTFE.

20. The CTTS as recited in claim 15, wherein the drive gear is positioned between the first and second driven sprocket-gears.

21. The CTTS as recited in claim 15, further comprising a pair of rub rails engaged with an edge of the frame, the rub rails each comprising nylon.

22. The CTTS as recited in claim 15, further comprising a gear guard disposed within the frame and configured and arranged to help prevent ingress of foreign matter to the sprocket-gears and the drive gear.

* * * * *